(12) United States Patent
Anthony

(10) Patent No.: US 8,186,160 B2
(45) Date of Patent: May 29, 2012

(54) THERMAL ENGINE FOR OPERATION WITH COMBUSTIBLE AND NONCOMBUSTIBLE FUELS AND ELECTRIC ENERGY

(76) Inventor: Michael Anthony, Coral Springs, FL (US)

( * ) Notice: Subject to any disclaimer, the term of this patent is extended or adjusted under 35 U.S.C. 154(b) by 707 days.

(21) Appl. No.: 12/380,626

(22) Filed: Mar. 2, 2009

(65) Prior Publication Data
US 2010/0218741 A1    Sep. 2, 2010

(51) Int. Cl.
*F01K 13/02* (2006.01)
*F01P 11/02* (2006.01)

(52) U.S. Cl. ............ 60/646; 123/41.14; 123/142.5 R; 123/241

(58) Field of Classification Search ............ 60/646, 60/657; 123/21, 41.14, 41.18, 41.55, 142.5 R, 123/241, 535, 543, 549, DIG. 1, DIG. 7
See application file for complete search history.

(56) References Cited

U.S. PATENT DOCUMENTS

| 4,522,166 | A  | * | 6/1985  | Toivio et al.   | 123/196 A |
| 6,606,860 | B2 | * | 8/2003  | McFarland       | 60/648    |
| 7,076,941 | B1 | * | 7/2006  | Hoffman et al.  | 60/643    |
| 7,464,672 | B2 | * | 12/2008 | Vetrovec        | 123/41.14 |
| 7,810,325 | B2 | * | 10/2010 | Bennett         | 60/517    |

* cited by examiner

*Primary Examiner* — Hoang M Nguyen
(74) *Attorney, Agent, or Firm* — Frank L. Kubler

(57) ABSTRACT

A thermal engine includes a cylinder and piston and an insulated thermal battery including at least a thermal mass such as the engine block itself for storing and retaining heat to enhance or cause fluid expansion within the cylinder and drive the piston, the thermal battery optionally including an electrolyte chamber containing a thermal electrolyte for functioning as an electric thermal battery. Heat is stored in the thermal battery such as by activating electric resistance heating elements in the thermal mass. The stored heat either causes expansion of a non-combustible expansion fluid such as water or enhances the expansion of a combustible expansion fluid such as gasoline. Where the thermal battery is an electric thermal battery containing an electrolyte, the storage of heat also stores electricity which can be used to power an electric motor.

21 Claims, 20 Drawing Sheets

THERMAL ENGINE FOR OPERATION WITH COMBUSTIBLE AND NONCOMBUSTIBLE FUELS AND ELECTRIC ENERGY

BACKGROUND OF THE INVENTION

1. Field of the Invention

The present invention relates generally to the field of engines which convert fuel and heat into mechanical energy. More specifically the present invention relates to a thermal engine such as for powering a vehicle, including a cylinder and piston and an insulated thermal battery including at least a thermal mass such as an engine block for storing and retaining heat to enhance or cause fluid expansion within the cylinder and drive the piston, the thermal battery optionally including an electrolyte chamber containing a thermal electrolyte for functioning as an electric thermal battery.

In its most basic form, as mentioned above, generally. The engine uses a modified conventional single or multi-cylinder gas engine configuration with the addition of a thermal mass to store power in the form of heat. The engine incorporates several conventional engine elements including a piston with a piston head and a piston rod or crank, an engine block made up of a cylinder case and a crankcase and containing a tubular cylinder within which the piston head is slidably and sealingly retained, a cylinder head including intake and exhaust valve ports and valves and defining an expansion chamber within the cylinder between the piston head and the cylinder head, a crank shaft mechanically linked to the piston opposite the cylinder head by the piston crank, valve operating means driven by rotation of the drive shaft, an expansion fluid tank, fluid delivery means for delivering expansion fluid from the fluid tank into the chamber, a thermal battery including a thermal mass for storing heat and in thermal communication with the chamber for heating expansion fluid within the chamber, thermal insulation surrounding the thermal battery for efficiently containing heat within the thermal mass for delivery into the chamber, thermal insulation surrounding said expansion fluid tank for efficiently containing heat within said expansion fluid, and engine starting means. The valve operating means preferably includes a cam shaft and push rods riding on cams along the cam shaft which pivot rocker arms in conventional fashion. A flywheel preferably is attached to the crankshaft and centered at the crankshaft rotational axis, and an output shaft coaxial with and fixedly connected to an end of the crankshaft preferably extends out of the crankcase through a shaft port to transmit engine power in the form of torque to any desired mechanical load. The expansion fluid delivery means preferably is a substantially conventional fuel injection system with an electronic controller module.

In general operation of the engine, heat is stored in the thermal battery which may consist solely of a thermal mass capable of storing heat such as by passing electric current through resistance heating elements embedded in the thermal mass, which preferably includes the engine block itself, the engine is started (the crankshaft is rotated), the intake valve is opened, the expansion fluid delivery means delivers a quantity of expansion fluid into the cylinder and then closes, and the heat stored in the fuel and in the thermal battery either causes or assists the expansion fluid to expand within the cylinder, whether by phase change or combustion, pushing the piston from a position at or near top dead center to bottom dead center, thereby rotating the crank shaft and producing mechanical energy. The exhaust valve then opens and continued angular momentum and rotation of the crank shaft and flywheel drives the piston back toward the cylinder head, pushing the remaining elements of the expansion fluid out of the cylinder so that the intake valve can again open and the exhaust valve close and the cycle repeat. The thermal mass is preferably a dense metal allow of high heat retention capacity, so that its coefficient of heat absorption is as high as possible. Iron alloys in combination with steel and titanium may be used as a thermal mass, however, several types of alloys can be used for the same purpose. The thermal mass could also be a shell of metal with very high melting point with a molten metal of lower melting point contained therein, so that the metal could be used to store as much heat as possible.

The engine preferably operates alternately on a combustible expansion fluid such as gasoline or natural gas, and on a noncombustible expansion fluid such as water. To this end, ignition means are provided in communication with the chamber for igniting a combustible fuel within the expansion chamber. A combustible fluid tank and a noncombustible fluid tank are further provided, which are each alternately and respectively in fluid communication with the fuel injection system through a combustible fluid line and fluid pump and a noncombustible fluid line and fluid pump. The non-combustible fluid tank is provided with heating elements for heating the expansion fluid to a temperature close to the boiling point of the expansion fluid. The non-combustible fluid tank is surrounded with an insulating material, to prevent heat loss from the tank. Advantageously, the heated expansion fluid is close to its vaporization temperature, and so little additional heating from the thermal battery can said expansion fluid to expand into a gas and do mechanical work.

In one embodiment of the invention, the Expansion fuel tank may be eliminated completely and replaced with an Expansion Fluid cooling coil so that the Expansion fuel may be recycled continuously to do work.

2. Description of the Prior Art

So-called multi-fuel and hybrid engines are known that can operate with different types of fuels and are based on certain thermodynamic principles, such as the Carnot cycle, the Rankine cycle, the Diesel cycle, or the Otto cycle in conjunction with stored electrical power to drive motors. These engines may also have heating elements for heating the engine block prior to starting the engine from a cold start, but the purpose of heating the engine block is not to reuse the heat from the block, but to preheat the fuel and engine for an easy start.

In combustion engines an air-fuel mixture is compressed and then ignited. The compression results in an expansion of gases within the cylinder chamber, pushing a piston slidably retained within the cylinder in a repeated cycle to turn a crank shaft and so to generate mechanical power from the fuel. The current prior art engines therefore rely only on combustible fuels that cause global pollution and health associated problems. In an effort to reduce the pollution and dependence on fossil fuels, several types of hybrid engines have been invented including electrically powered vehicles which rely on the storage of electric power in batteries in chemical form.

While these vehicles are of current interest, a growing concern about the disposal of electric batteries, and the efficient global transformation of these new technologies to replace existing technologies has emerged.

What is needed is an engine design which adopts a philosophy of replacing or assisting existing technologies such as fossil fuel engines and electric powered engines, and which thermally generates power and improves efficiencies of current designs without substantial change to current engine manufacturing technology.

It is thus an object of the present invention to provide an engine which can be operated with two types of expansion fluids having different means of expansion and thereby achieve a high degree of efficiency during operation. An engine of this kind, in accordance with the invention, uses one of two fuels to operate. Fuels of the combustible type can be used as in conventional technologies to generate power by exploding the fluids within the engine to generate expansive power. Fuels of the non-combustible type, such as water, can be used when such an engine is provided with a new type of thermal energy storage battery technology. As opposed to electrical batteries that store power chemically for later use, a thermal battery of the type used in this invention only stores thermal energy in a thermal mass. Since the energy from such a thermal battery can be substantially used to expand a liquid such as water to a gas, the battery can be used to store enough energy at earlier times, to power an engine that requires low torque at later times. In some cases, the thermal mass of such a battery can be used as an electrolyte to also store energy in both chemical and thermal forms for later uses. The thermal battery can then be optimized by its geometry through maximizing the thermal mass and minimizing the surface area of the thermal battery for storing a maximum amount of thermal energy in the form of a direct heat with little losses. Without limiting the scope of the invention, however, the preferred mode of operation is in a pure thermal mode where the thermal battery is simply a thermal mass for storing heat. The expansion fluid that is used in such a battery can be stored in an insulated tank that allows heating of the expansion fluid to a temperature close to its boiling point. Thus, little additional will be needed to expand the expandible fluid to its gaseous form by a phase change and thus to do work on an engine.

One of the great advantages of such an engine, is that when the engine encounters higher altitudes than the altitudes at which it is charged with heat, its efficiency is higher, since the expansion fluid can expand at even lower temperatures that at such lower altitudes. So the engine can be used in low torque applications at high altitudes.

It is another object of the present invention to provide and thermal battery which can be used in conjunction with a molten electrolyte contained within the battery as a thermal mass to store both heat and electric energy simultaneously.

It is still another object of the present invention to provide such an engine in which pressure generated when vapor expands from a liquid state can then be used when the engine operates as a vapor powered engine, whereof, a liquid such as water or a combination of water and ethanol is injected into the thermal mass of the engine to generate expanded steam when the cylinder head is at top dead-center. Advantageously, much more energy can be stored in such a thermal battery than in a conventional electric battery of the same weight.

It is another objective of this invention to provide such an engine that uses an expansion fluid that is preheated close to its boiling point, so that a thermal mass that stores thermal energy cab be used to store thermal energy which can later be used to expand said expansion fluid to a gas and generate power to drive said engine.

It is an objective of the present invention to disclose a thermal engine which uses a closed cycle to recycle an Expansion fuel.

It is finally an object of the present invention to provide such an engine which is highly efficient and easy to operate.

SUMMARY OF THE INVENTION

The present invention accomplishes the above-stated objectives, as well as others, as may be determined by a fair reading and interpretation of the entire specification.

A thermal engine is provided, including a piston with a piston head and a piston crank; an engine block made crank case and a cylinder case and containing a tubular cylinder within which the piston head is slidably retained; a cylinder head comprising intake and exhaust valve port means and valve means and defining an expansion chamber within the cylinder between the piston head and the cylinder head; a crankshaft mechanically linked to the piston crank opposite the cylinder head by the piston crank; valve operating means; an Expansion fluid tank; fluid delivery means for delivering an expansion fluid from the expansion fluid tank into the expansion chamber; a thermal battery comprising a thermal mass for storing heat and being in thermal communication with the expansion chamber for heating and expanding a fluid within the expansion chamber; a thermal shell thermal insulation surrounding the thermal battery for efficiently containing heat within the thermal mass for delivery into the expansion chamber; and engine starting means; so that when the engine starting means starts the engine, the valve means opens the intake and exhaust means, the expansion fluid delivery means delivers a quantity of expansion fluid into the expansion chamber and then closes, and the heat stored in the thermal battery one of: causes and assists the expansion fluid to expand within the cylinder, whether by phase change or combustion, pushing the piston head from a position substantially at top dead center to bottom dead center, thereby rotating the crank shaft and producing mechanical energy.

The valve operating means preferably is driven by rotation of the drive shaft. The valve operating means preferably includes a cam shaft and the valves ride on cams along the cam shaft. The thermal engine preferably additionally includes a flywheel attached to the crankshaft and centered at the rotational axis of the crankshaft; and an output shaft coaxial with and fixedly connected to an end of the crankshaft extending out of the crankcase through a shaft port to transmit engine power in the form of torque to a desired mechanical load. The Expansion fluid delivery means preferably includes a fuel injection system.

The thermal engine preferably additionally includes a thermal mass heating means including at least one electrical resistance heating element extending into the thermal mass and an electric heating element circuit; and an element power source for delivering electric current through the at least one heating element and thereby heating the thermal mass. The thermal mass optionally includes the engine block.

The thermal engine preferably operates alternately on a combustible expansion fluid and on a noncombustible expansion fluid, the engine additionally including: ignition means in communication with the chamber for igniting a combustible fuel within the expansion chamber; and a combustible fluid tank and a noncombustible fluid tank, which are each alternately and respectively in fluid communication with the fuel injection system through a combustible fluid line and fluid pump and a noncombustible fluid line and fluid pump; so that when greatest power is needed, the engine is driven by ignition of combustible expansion fluid, and by phase change of noncombustible expansion fluid when less power is needed.

The thermal battery preferably is an electric thermal battery containing a battery electrolyte, and the engine alternately operates when less power is needed on a motor driven by electric power stored through entry of heat into the battery electrolyte.

In accordance with the present invention, a thermally charged battery is used in one mode of operation to generate mechanical energy by a phase change of a liquid such as water. The engine can also be used in another mode as a hybrid for producing additional power in an otherwise conventional combustion engine or in a conventional electric powered engine. In the case of use with a conventional combustible fuel, the engine operates at a higher efficiency, because much more thermal energy is incorporated into the fuel mixture during combustion by a thermally loaded non-electric battery, referred to herein as a fluid mass. The thermal energy stored in the thermal battery cause the fuel to expand into a gas by a phase change and thus permits the same engine to run as a conventional engine without much change to the engine configuration. Additionally, the thermal battery can act simultaneously as a conventional electric thermal battery to simultaneously power an engine by mechanical means and by electrical means. Accordingly, the present invention can take the form of a combustion engine or an electric engine, either separately or in combination.

An object of the prevent invention is to provide an engine which can be operated with two types of expansion fluids having different means of expansion and thereby achieve a high degree of efficiency during operation. Advantageously, the expansion fluid could be a mixture of water and other expansible fluids. An engine of this kind, in accordance with the invention, can be optimized by its geometry through maximizing the thermal mass and minimizing the surface area of the thermal battery for storing a maximum amount of thermal energy in the form of a direct heat with minimal losses of heat.

Essentially, a heat storing thermal battery is incorporated into the engine which permits heat energy to be stored mechanically instead of chemically as in the case of a conventional electric battery. Advantageously, the entire engine block can be used as a thermal source in the form of a thermal mass, so that a large amount of thermal energy can be stored for later use. The thermal battery can be charged with heat to a high temperature using electric heaters, induction heats or other forms of heat generators incorporated into of the thermal battery.

Advantageously, the present engine can be used with conventional combustible fuels during high power demand, and then during low power demand, the fuels can be changed to a liquid such as water. Thus, the engine can not only be used as a phase change engine with a liquid expansion fluid such as water, but also can be used as a combustion engine when needed. The engine can use both water and a combustible fuel as expansion fluids, or can use either expansion fluid separately. Additives such as ethanol or other alcohols can be incorporated with the water as a base fuel.

The pressure generated when vapor expands from a liquid state can then be used when the engine operates as a vapor powered engine, whereof, a liquid such as water is injected into the thermal mass of the engine to generate steam when the cylinder head is at top dead-center. Advantageously, much more energy can be stored in such a thermal battery than in a conventional electric battery of the same weight.

It is important note that there exist other types of electrical thermal batteries which use liquid lithium and other molten salts as electrolytes. These existing electrical batteries are, however, only suitable for storing electrical energy. The current thermal battery is a true thermal battery which can be used to supply mechanical energy stored in the form of heat when power is needed. Advantageously, the present thermal battery can be used in conjunction with a molten electrolyte contained within the thermal battery as a thermal mass to store both heat and electric energy simultaneously. Without limiting the scope of the invention, however, the preferred mode of operation is in a pure thermal mode where the thermal battery is simply a thermal mass.

In the non-combustible expansion fuel mode of the engine operation a liquid such as water is used as a expansion fluid, part of the thermal mass is projected into the cylinder head to create a heat source for generating vapor pressure. The vapor expands and causes the piston to produce mechanical energy by rotating a crank shaft, just as in the conventional gas engine. The supply of the fuel quantities is controlled by electronic fuel injectors, so that when a change over from a combustible expansion fluid such as a conventional fossil fuel to non-combustible water is needed, an exact metering of the expansion fluid can be achieved which has at least a level of control for the different expansion fluids.

In the mode where the engine is used with combustible fuels, the engine expediently includes a valve configured to provide a plurality of expansion fluid flows from at least two tanks to the cylinder, whereby the injection of each type of expansion fluid can be readily induced upon demand. In the case of switching over from a combustible Expansion fluid to a phase change expansion fluid, a simple electronic instruction is given to the valve to switch from one expansion fluid type to another so that the process of transformation is simple and effective. The slight mixing of expansion fluids which may occur during such a change is operationally insignificant or negligible.

While the invention can be used only with a noncombustible phase change liquid such as water, it may also be used in combination with or separately from a combustible expansion fluid such as gasoline, and other fossil fuels.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
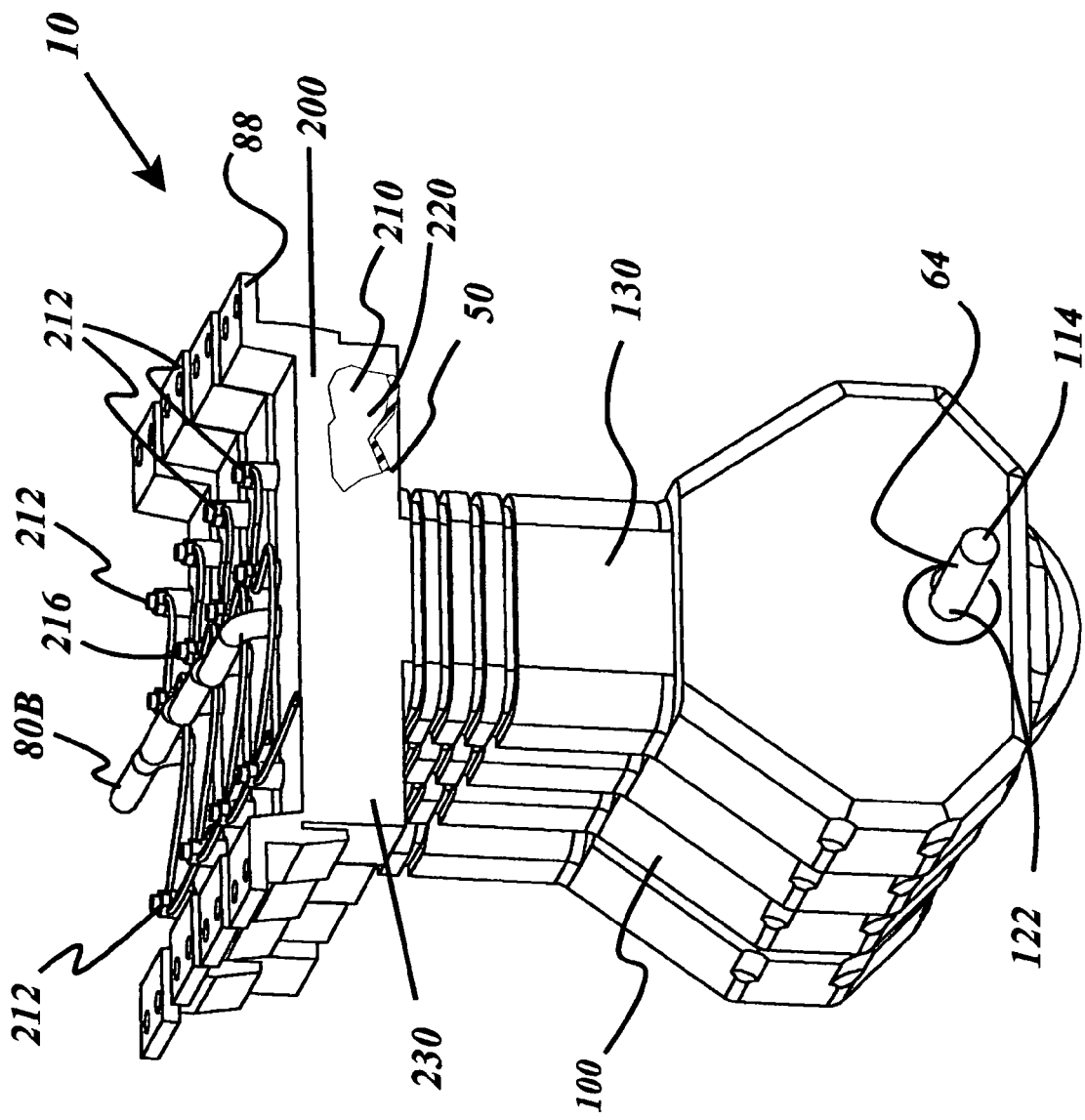
FIG. 1 is an upper perspective view of an embodiment of present engine having four interconnected cylinder casings, with the expansion fluid tank removed to reveal the tank bolt on stands and the electric heating elements and heating element circuit.
Figure 2:
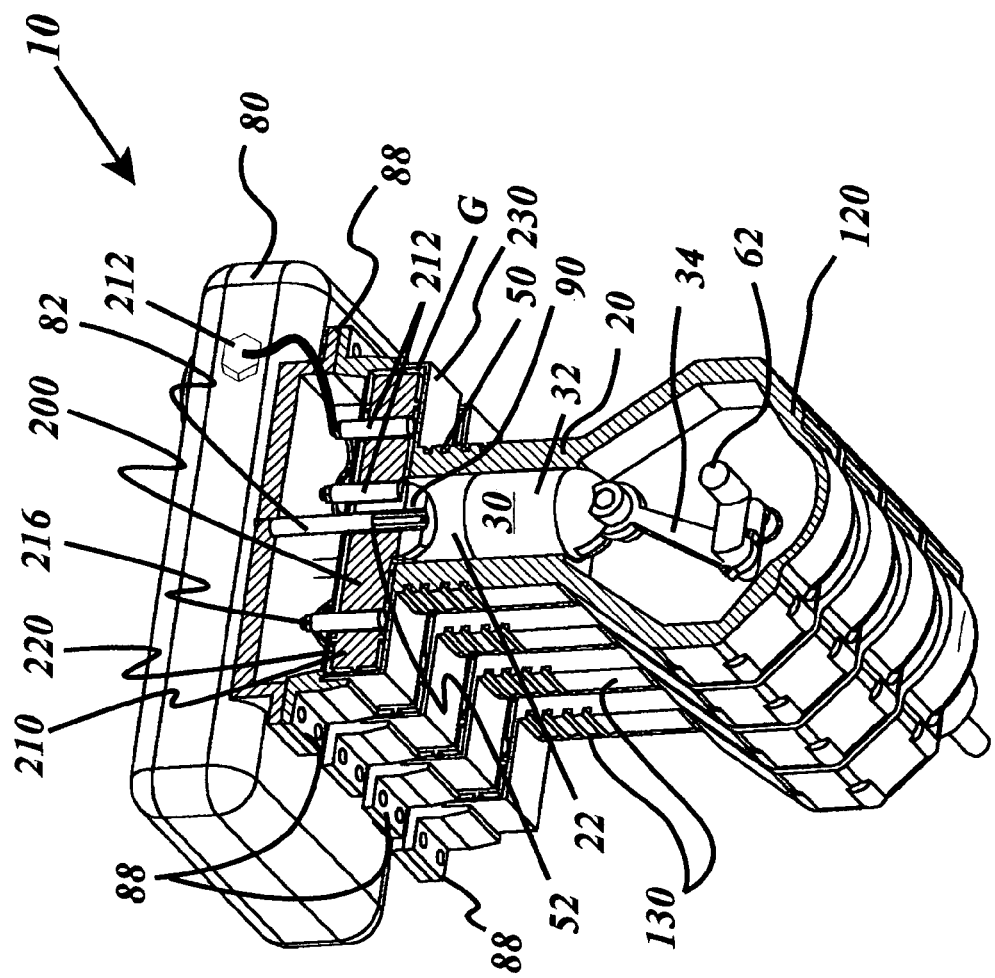
FIG. 2 is a lower perspective view of the engine of FIG. 1, with the expansion fluid tank included and showing the forward end of the crankcase in cross-section to reveal the cylinder, piston, crank, crankshaft, thermal protrusion, expansion fluid line and sump.
Figure 3:
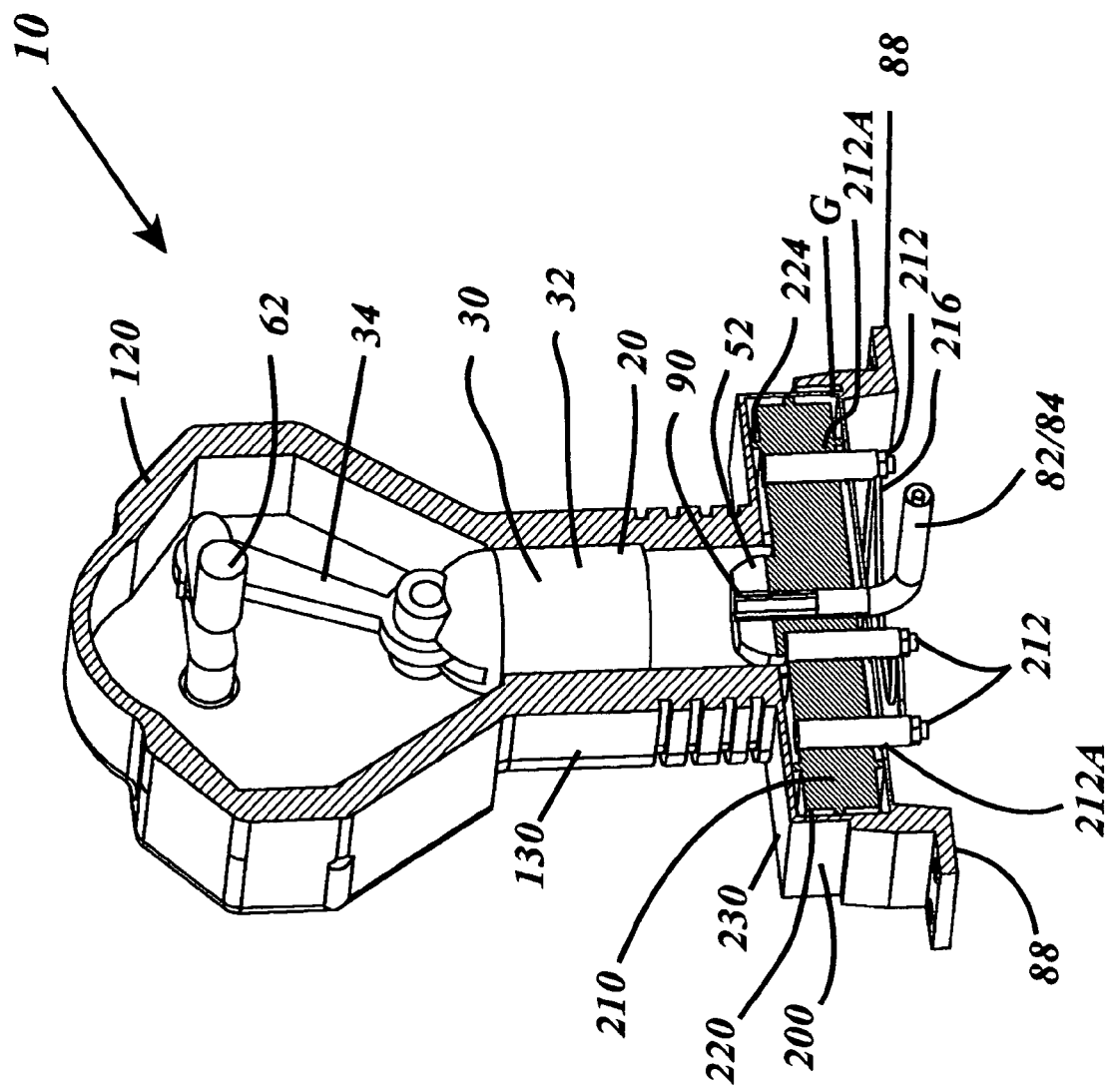
FIG. 3 is an inverted cross-sectional view of an engine as in FIG. 1, revealing the thermal battery in the form of a thermal mass, as well as the cylinder, piston, crank, crankshaft, thermal protrusion, insulated expansion fluid line and sump.
Figure 4:
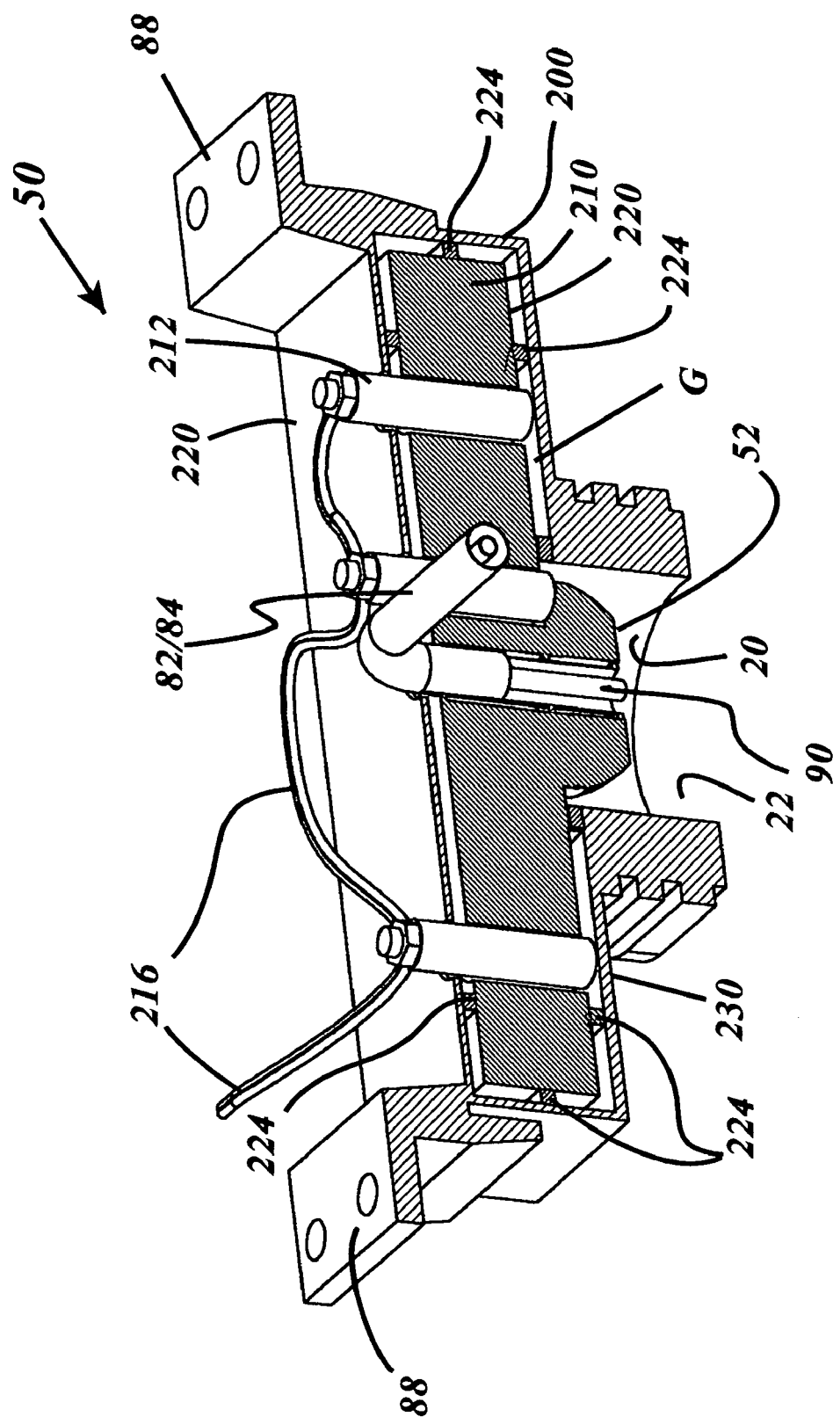
FIG. 4 is a cross-sectional upper perspective view of the separated cylinder head as in FIG. 3, thermal protrusion, thermal mass, insulated expansion fluid line, heating elements and heating element circuit and tank bolt on stands.
Figure 5:
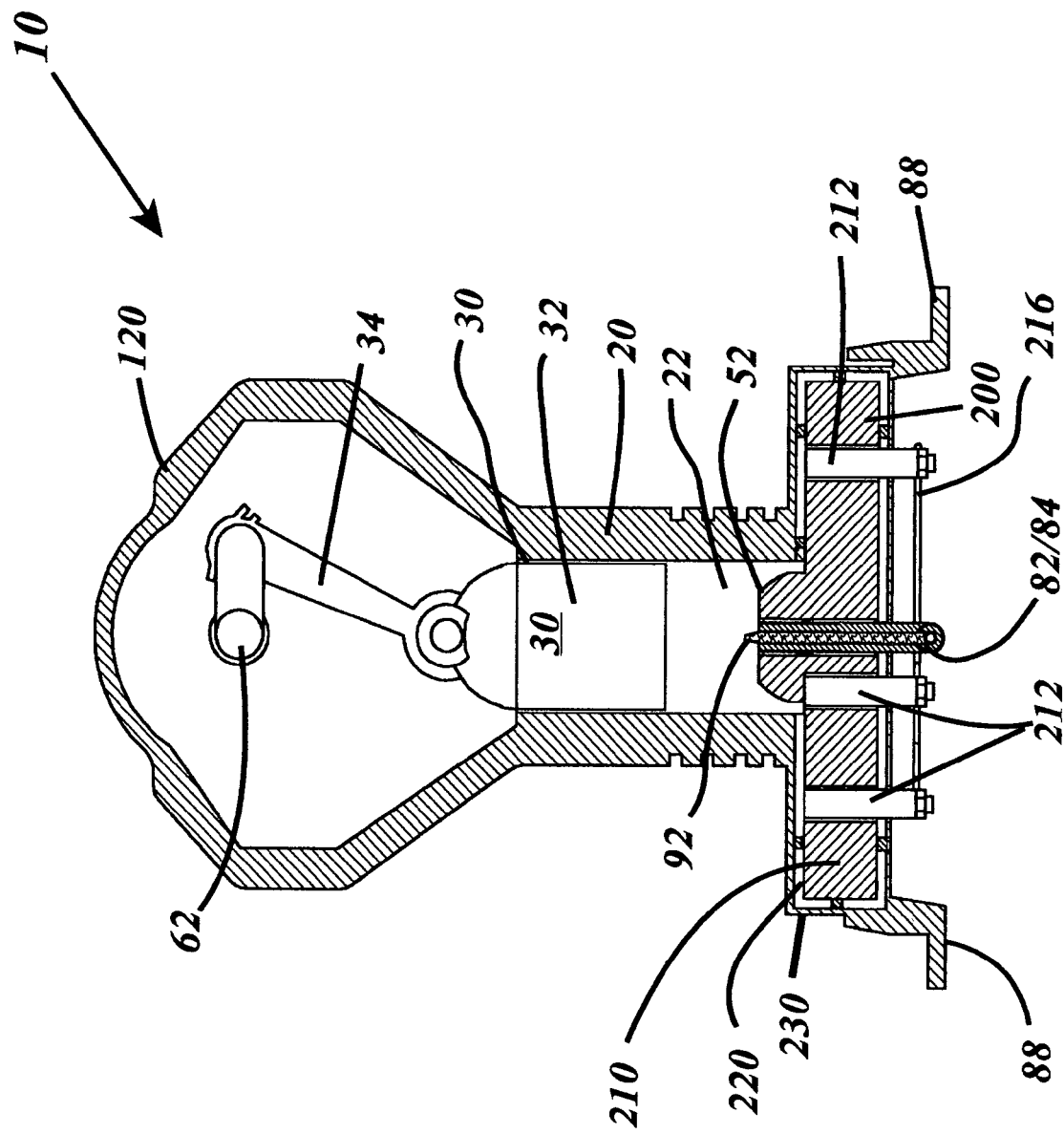
FIG. 5 is a cross-sectional end plan view of the engine as in FIG. 3.
Figure 6:
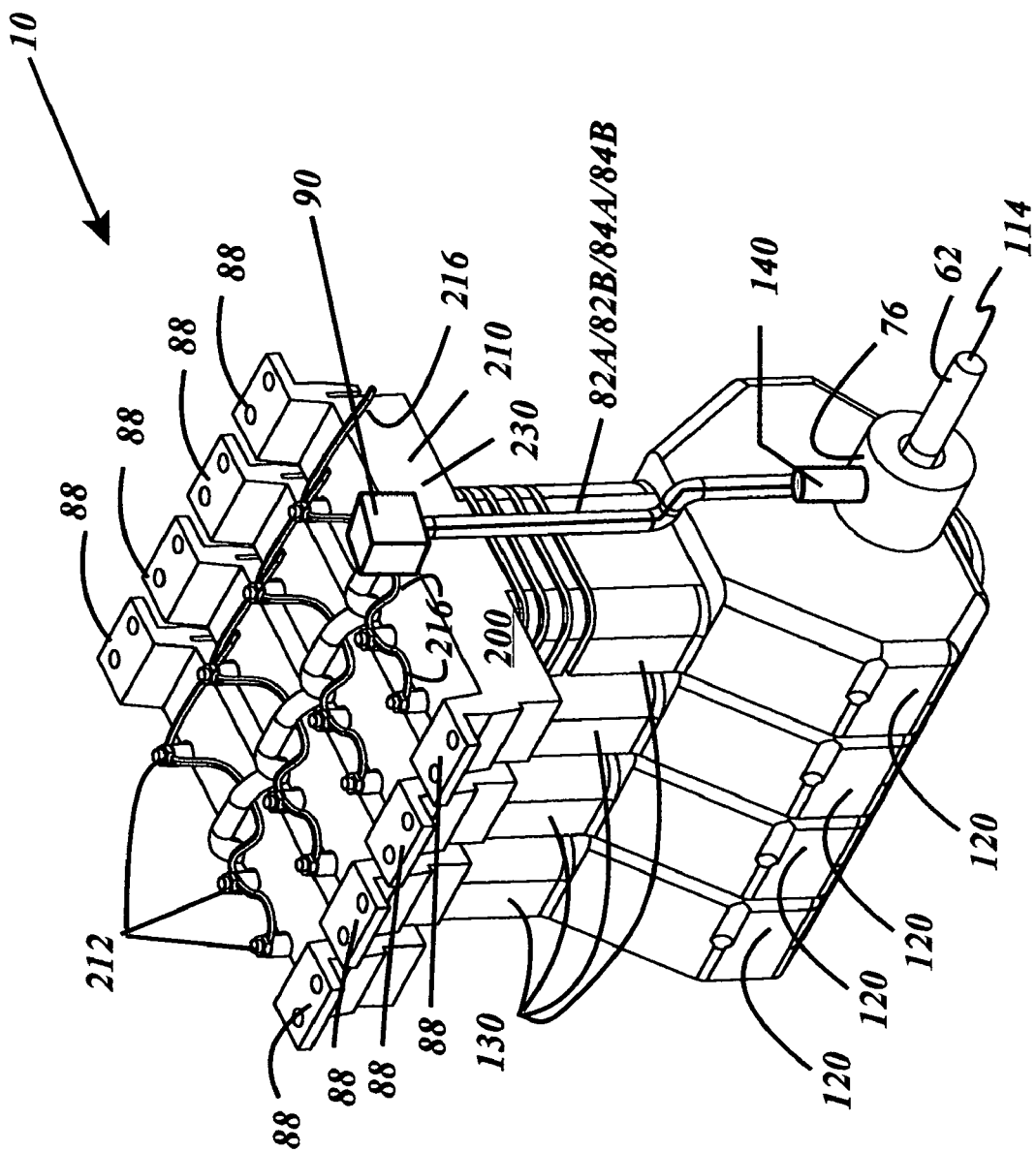
FIG. 6 is another perspective of the embodiment shown in FIG. 1, with a multi-cylinder configuration, and showing a rotary cam valve and a fuel selector valve added for injection of expansion fluid into the cylinders.
Figure 7:
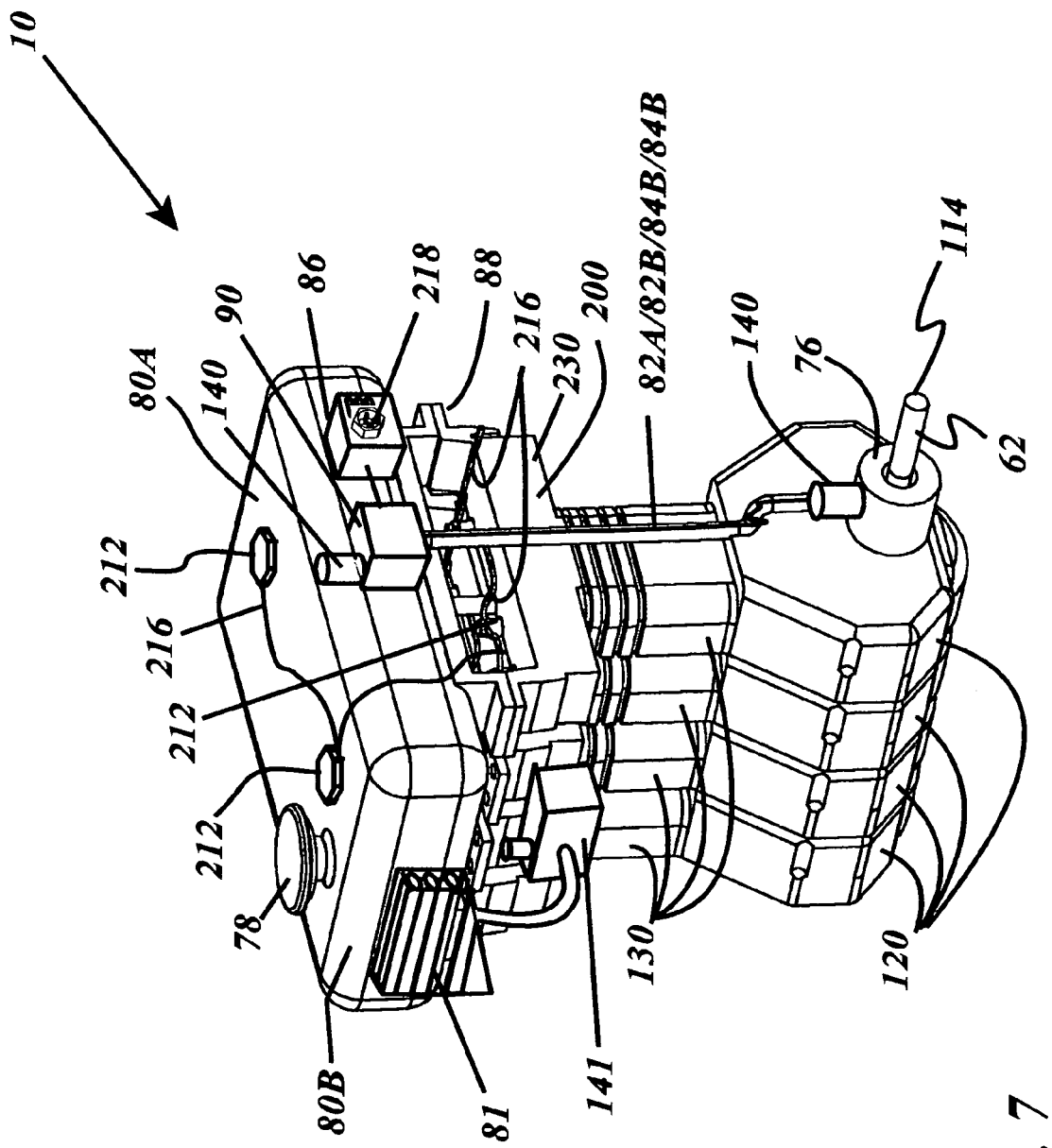
FIG. 7 is a view as in FIG. 6, with the expansion fluid tank added.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

Referring to FIGS. 1-20, a thermal engine 10 is disclosed such as for powering a vehicle, including a cylinder 20 and piston 30 and an insulated thermal battery 200 including at least a thermal mass 210 such as an engine block 40 for larger engines or such as the piston 30 for smaller engines for storing and retaining heat to enhance or cause fluid expansion within the cylinder 20 and thereby drive the piston 30, the thermal battery 200 optionally including an evacuated insulating chamber 240 surrounding an electrolyte chamber 220 containing a thermal electrolyte TE for functioning as an electric thermal battery 200. The electrolyte chamber 220 is surrounded by an outer evacuated thermal insulating chamber 240 and the space G between said thermal insulating chamber 240 and the electrolyte chamber 220 forms an evacuated region G, so that heat loss from the thermal battery 200 is minimal. The electrolyte forms a thermal mass 210 for the thermal battery.

In its most basic form, as mentioned above generally, engine 10 incorporates several conventional engine elements including a piston 30 with a piston head 32 and a piston rod or piston crank 34 driving a crankshaft 112, an engine block 40 made up of a cylinder case 130 and a crankcase 120 and containing a tubular cylinder 20 within which the piston head 32 is slidably and sealingly retained, a cylinder head 50 including intake and exhaust valve ports 54 and valves 56 and defining an expansion chamber 22 within the cylinder 20 between the piston head 32 and the cylinder head 50, a crank shaft 62 mechanically linked to the piston 30 opposite the cylinder head 50 by the piston crank 34, valve operating means 70 driven by rotation of the drive shaft 64, an expansion fluid tank 80, expansion fluid delivery means 90 for delivering Expansion fluid EF from the fluid tank 80 into the chamber 22, a thermal battery 200 including a thermal mass 210 such as the battery electrolyte BE itself and the battery housing for storing heat, the thermal mass being in thermal communication with the chamber 22 for heating Expansion fluid EF within the chamber 22, a thermal insulation chamber 240 surrounding the thermal battery shell 220 containing the thermal mass 210 of thermal battery 200 for efficiently containing heat within the thermal mass 210 for delivery into the chamber 22, and engine starting means 66.

If the thermal mass is a molten or liquid electrolyte BE, then thermal battery shell 220 is necessary to contain it. However if the thermal mass 210 is a solid metal, then it is preferably retained within an evacuated insulation chamber 240 without the thermal insulation shell 220. Thermal insulating shell 220 could be a thin layer of ceramic foam to prevent further loss of heat from the thermal mass 210. The evacuated insulating chamber 240 may surround the thermal mass 210 within the thermal insulation shell 220 to further enhance insulation of the thermal mass 210. A steam exit port 224 preferably is provided in the insulation shell 220.

The valve operating means 70 preferably includes a cam shaft 72 having cam valves 56 which ride on cam shaft cams 72A, or may include conventional push rods (not shown) riding on cam shaft cams 72A which pivot rocker arms (not shown) in conventional fashion. A flywheel 110 preferably is attached to the crankshaft 112 and centered at the crankshaft 112 rotational axis, and an output shaft 114 coaxial with and fixedly connected to an end of the crankshaft 112 preferably extends out of the crankcase 120 through a shaft port 122 to transmit engine power in the form of torque to any desired mechanical load. The expansion fluid delivery means 90 preferably is a substantially conventional fuel injection system 90.

In general operation of the engine 10, heat is stored in the thermal battery 200 which may consist solely of a thermal mass 210 capable of storing heat such as by passing electric current through resistance heating elements 212 embedded in the thermal mass 210, which preferably includes the engine block 40 itself, the engine is started (the crankshaft 112 is rotated), the intake valve 56 is opened, the expansion fluid delivery means 90 delivers a quantity of heated Expansion fluid EF into the cylinder 20 and then closes, and the heat stored in the thermal battery 200 either causes or assists the Expansion fluid EF to expand within the cylinder 20, whether by phase change or by combustion, pushing the piston 30 from a position at or near top dead center to bottom dead center, thereby rotating the crankshaft 112 and producing mechanical energy. The exhaust valve 56 then opens and continued angular momentum and rotation of the crankshaft 112 and flywheel 110 drives the piston 30 back toward the cylinder head 50, pushing the remaining elements of the Expansion fluid EF out of the cylinder 20 so that the intake valve 56 can again open and the exhaust valve 56 close and the cycle repeat. The exhausted Expansion fluid EF can also be recycled back into fluid tank 80 by allowing the exhausted Expansion fluid EF to be cooled back to a liquid form by cooling coil 81, so that there may be no need to waste the Expansion fluid EF to atmosphere. In this configuration, the Expansion fluid Ef is continuously used and is only replenished when it is reduced by losses and when the engine 10 is to be maintained.

The engine 10 preferably operates alternately on a combustible Expansion fluid EF such as gasoline or natural gas, and on a noncombustible Expansion fluid EF such as water. To this end, starter means 66 include ignition means 68 such as an ignition wire leading to a spark plug 68 in communication with the chamber 22 for igniting a combustible Expansion fluid EF within the expansion chamber 22. A combustible fluid tank 80A and a noncombustible fluid tank 80B are further provided, which are each alternately and respectively in fluid communication with the fuel injection system 90 through a combustible fluid line 82a and fluid pump 301 and a noncombustible fluid line 84a and fluid pump 301. Noncombustible fluid tank 80B is surrounded by heat insulation I, so that when non-combustible fluid EF is heated, little heat can escape from it. Non-combustible fluid tank 80B is also provided with electric heating elements 212 to heat non-combustible Expansion fluid EF to a temperature close to but not exceeding its boiling point. The return combustible fluid line 82b and the return non-combustible fluid line 84b deliver the selected Expansion fluid EF from the fuel selector valve 140 by means of a dual port fuel pump 301. In the case when the Expansion fluid Ef is recycled. Exhaust return valve 141 diverts the Expansion fluid Ef to a cooling coil 81 which cools the expanded exhaust vapor and then re-condenses it back to a liquid state that can be returned to the fluid tank 80 for reuse. The fluid lines 82b and 84b extend from fuel selector valve 140 and then enters to the engine block 40 into injector nozzle 303 through a fluid line entry port on the engine block 40. The fluid pumps 301 may be operated by a rotary cam 76 attached to the shaft, so that fuel that is delivery is synchronized with the rotation of the shaft and piston positions. Fuel selector valve 140 may be incorporated into a synchronized rotation of the output shaft 64 to deliver fuel selected by the command of controller 86. In such a case, a simple centrifugal valve can be incorporated to determine the speed of the engine and automatically open the appropriate fuel line depending on the speed of rotation. In such a case, the non-combustible fuel line will open when the speeds are high and only cruising is required, and the combustible fuel line will open when the speeds are low and higher engine torque is required. Alternately, fuel selector valve 140 and exhaust return valve 141 may be electronically controlled without the need for synchronization with the rotation of the output shaft 64 by an electronic controller 86. When the greatest power is needed, the engine 10 is driven by ignition of combustible Expansion fluid EF such as during acceleration of a vehicle (not shown) driven by engine 10, and by phase change of noncombustible Expansion fluid EF when less power is needed, such as while maintaining a steady speed or during vehicle deceleration.

In this hybrid form, the thermal engine 10 preferably includes an engine block 40 including a cylinder case 130 surrounding the cylinder 20 and a crankcase 120 surrounding the crankshaft 112. A sump case 48 is provided at the crankcase 120 lower end for retaining oil and an oil pump 122 and grit or other debris. As shown in FIGS. 1-7, the cylinder head 50 includes a thermal battery 200 in the form of a block or panel of thermal mass 210 material such as steel or aluminum which extends across the cylinder 20 open end defining a cylinder head 50 and includes a convex thermal protrusion 52 sized and positioned to extend into the chamber 22 portion of the cylinder 20 for efficiently transferring heat into the expansion chamber 22. The thermal battery 200 preferably is contained within an insulation shell 220 formed of thermally insulating material, and this shell is surrounded by a thermal battery outer wall 230, where thermal battery spacers 222 preferably extend between and maintain a vacuum gap or an air gap G forming an evacuated insulating chamber 240 between the insulation shell 220 and the thermal battery outer wall 230 to provide added thermal insulation. Thermal battery spacers 222 are preferably made from highly insulative materials such as ceramic, and ceramic-metal composite foams. Gap G could also be filled with insulating ceramic foams and composites to increase the insulation value of evacuated insulating chamber 240. A series or grid of the electric heating elements 212 referenced above extend into thermal block ports 212A in the thermal mass 210 and are connected to an electric power source through a heating element circuit 216. The heating element circuit 216 preferably includes an electric connector 218 so that the electric power source (not shown) for the circuit 216 can be disconnected from the engine 10 after the thermal battery 210 is sufficiently heated. The thermal mass 210 preferably is heated to red hot temperatures over a period of time such as overnight. Fluid lines 82a and 84a extend from an expansion fluid tanks 80a and 80b to a fluid selector valve 140. Fluid selector valve 140 is fluidly connected to the injection spray valve 92, by means of fluid delivery lines 82b and 84b. These fluid line connect through the center of the thermal protrusion 52 and open into the chamber 22 portion of the cylinder 20. The dual expansion fluid tank 80a and 80b have fluid port covers 78a and 78b and is mounted on opposing fastened-together sets of first and second expansion fluid tank brackets 88 extending from the thermal battery outer wall 230 opposite the cylinder case 130. It is clear that one skilled in the art can use the engine 10 with either fluid tank 80a or 80b separately or in combination. An optional cooling coil 81 is provided to cool and recycle Expansion fluid EF back into a liquid form and then into fluid tank 80b if Expansion fluid EF recycling is essential. This option can be used when the Expansion fluid EF is a highly expansive liquid that cannot be released into the atmosphere, such as a refrigerant, a cryogenic fuel, an ammonia/water mix, or alcohol/water mixes. In such a case, fluid tank 80b must be constructed to maintain the required pressure to keep the Expansion fluid EF in a liquid state.

All bearings and materials used in the invention are preferably suitable for high temperature operations and may be made from ceramic composites. Care must be taken to design the bearings and casing to avoid extreme thermal expansion and contraction, and so spacers 222 must allow thermal mass 210 to slightly move with expansion and contraction as its temperature changes.

Figure 13:
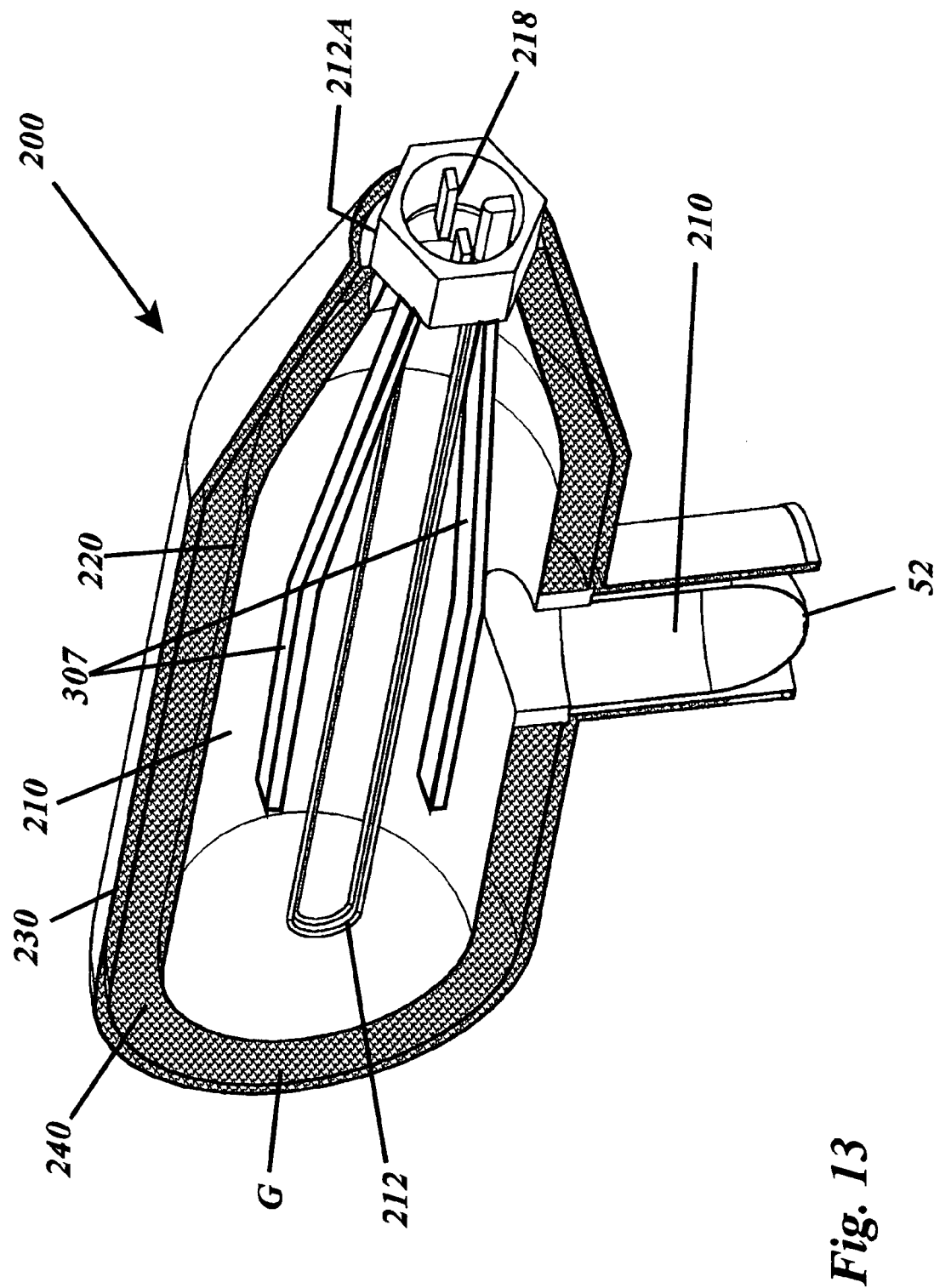
FIG. 13 is a cross-sectional perspective view of the present invention with the thermal mass also acting as an electric thermal battery, wherein a portion of the electrolyte chamber is configured to protrude into the expansion chamber to define the thermal protrusion. The electrolyte is a molten mass of salts or metals.

A preferred embodiment of the present invention incorporates pre-existing electrical thermal battery 200 as illustrated in FIG. 13, where its electrolyte BE contents additionally serve as a thermal mass 210 contained withing insulation shell 220 as defined in this application as an element of the present thermal engine 10. This particular type of electric battery already exists and is illustrated as part of the present thermal engine 10, includes a molten electrolyte BE within insulation shell 220. The electrolyte BE could be an aluminum-alloy salt which melts at approximately 2000 degrees Fahrenheit, and which thus preferably is heated in advance of starting the engine 10 such as with at least one of the above described electric heating elements 212. An electric connector 214 and a temperature gauge 302 are provided to charge the battery electrically, as well as heat up the thermal mass 210. The end of the evacuated insulation chamber 240 is electrically connected by a cable harness 304 to a controller 86 where a connector cable 305 connects power to an electric motor 300. Electrodes 307 are used to generate power from the thermal battery 200 using the electrolyte thermal mass 210. Since the electrolyte BE also serves as a thermal mass 210, its heat energy can be used as described above to power a piston/cylinder based engine using a non-combustible Expansive fluid EF. When electrical power is needed, the controller 86 sends electrical power from the electrolyte BE to motor 300 and thus provides additional heat energy to expansively drive the output shaft 64. Motor 300 is connected to output shaft 64 by means of a differential gear system 308 which selects power from the motor 300 or the crank shaft 112 using Expansion fluids EF. Advantageously not only is it possible to gain power from the thermal mass 210, one also gains electrical energy from the electrolytic BE's thermal mass 210 to drive the output shaft 64. Controller 86 serves to control the power output and delivery of Expansion fluid EF and electrical power to the engine.

For this embodiment, the power output of shaft 64 is monitored by a speedometer 306. The signal from the speedometer is used to determine if electrical power, or Expansion fluid EF, can be used to power the vehicle or machinery. In low torque modes, the electrical circuit could be activated to deliver power to drive motor 300 if needed. Additionally controller 86 could divert power from the thermal battery 200 and deliver power using either a combustible Expansion fluid EF, or a non-combustible Expansion fluid EF.

The thermal battery 200 is designed so that the evacuated insulating chamber 240 includes a convex thermal protrusion 52 as described below generally but in this instance containing molten electrolyte BE and extending into the cylinder 20. The evacuated insulation chamber 240 is insulated and preferably its inner walls are reflectively coated like the inner surface of a thermos flask. Electronic controller 86 is incorporated to process the logical sequences of selective use of the two types of Expansion fluids EF and the electrical power thus generated. Expansion fluid tanks 80A and 80B have supply lines that are connected to solenoid based electronic fuel selector valve 140 which in turn are electronically controlled by electronic controller 86. The Expansion fluid tanks 80a and 80b can be separate tanks or joint tanks, but must not mix their contents at any time, unless the Expansion fluids EF used in either tank are interchangeable. When only a non-combustible Expansion fluid EF that needs to be recycled is used with the engine 10, electronic controller 86 may be used to close off the exhaust valve 56 and divert the expanded Expansion fluid EF to cooling coil 81 to be returned to fluid tank 80b. In the case when the engine 10 is only used with a non-combustible Expansion fluid EF, fluid tank 80a that carries combustible fuel may be eliminated all together so that the engine 10 only works with non-combustible fluid EF.

Figure 20:
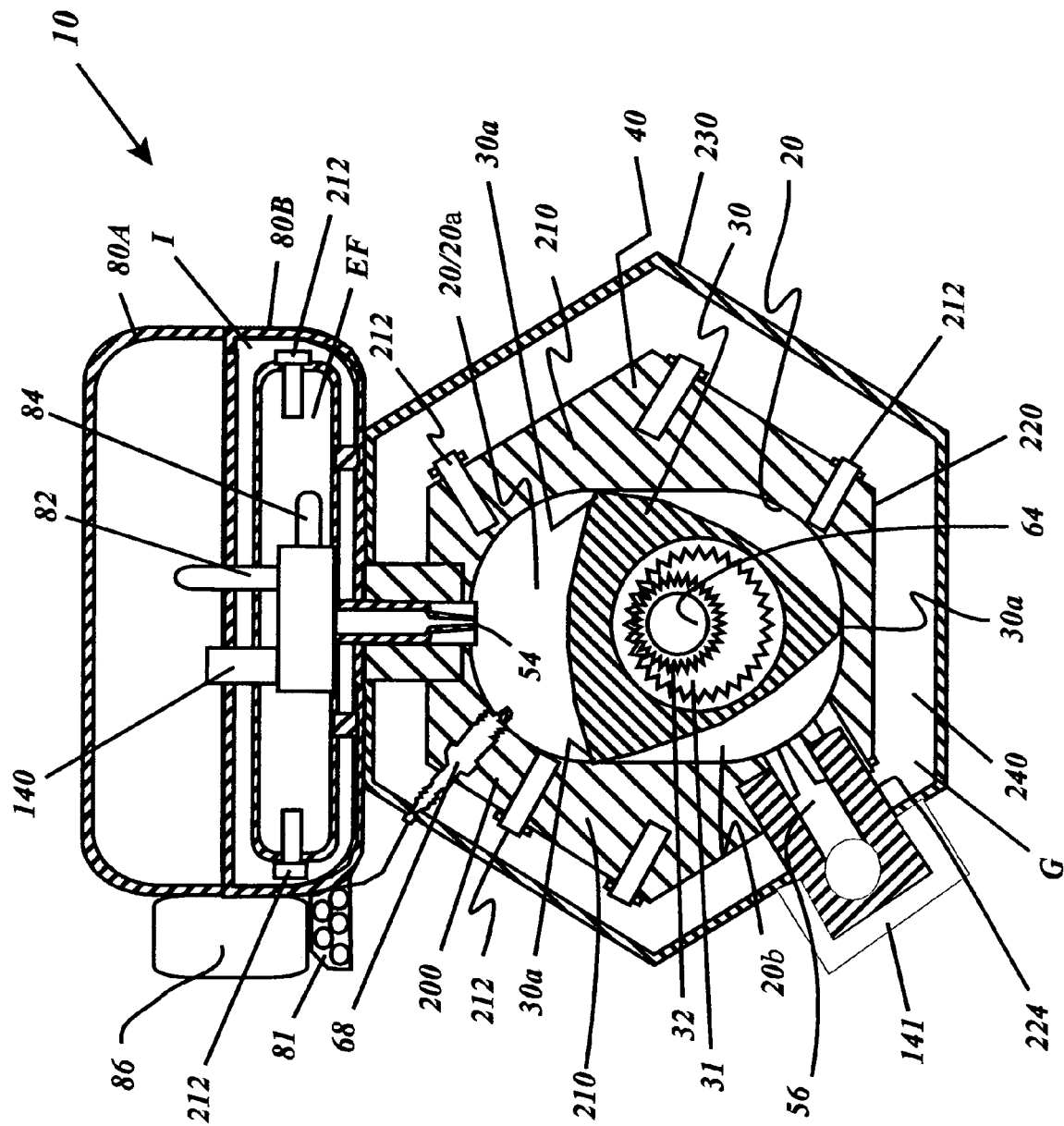
FIG. 20 shows a rotary form of the engine of the present invention with a rotary piston and cylinder configuration, including a tank for the expansible fluid.

Advantageously, the engine could also be constructed as shown in FIG. 20, as a conventional rotary engine such as the Enike rotary engine. Referring to FIG. 20, a thermal engine 10 is disclosed such as for powering a vehicle, including a cylinder 20 and piston 30 and an insulated thermal battery including at least a thermal mass 210 such as an engine block 40 for larger engines or such as the piston 30 for smaller engines for storing and retaining heat to enhance or cause fluid expansion within the cylinder 20 and thereby drive the piston 30. The cylinder 20 is partitioned into an expansion chamber 20a and an exhaust chamber 20b, by its sealing configuration with the bearing surfaces 30a of piston 20. The piston 30 has an internal sun gear 31 which is rigidly attached to piston 30 so that it can rotate with piston 30. Drive shaft 64, is mechanically connected to the piston 30 via moon gear 32 so that when piston 30 rotates, sun gear 31 will cause drive shaft 64 to rotate by means of moon gear 32. An Expansion fluid EF valve delivery valve port 54 delivers Expansion fluid EF into expansion chamber 20a. When Expansion fluid EF is delivered to intake valve port 52, thermal mass 210 heats it to expand by phase change and drives piston 30 to rotate and increase the volume of chamber 20a within the cylinder 20. Since Expansion fluid EF is close to its boiling point, very little heat from the thermal mass 210 is needed to create a substantial phase change of the Expansion fluid EF into a gas. Upon rotation, piston 30 entraps the expanded Expansion fluid EF and transports it to exhaust valve 56, where the expanded Expansion fluid EF is released to atmosphere.

Advantageously, a thermal insulation shell 220 surrounds the thermal mass 210 for efficiently containing heat within the thermal mass 210 and for use in storing an electrolyte BE. As with previous embodiments, a starter means is provided to initiate the process. Controller 86 is also needed to control the delivery of Expansion fluid EF in a timely manner to the engine 10.

The thermal mass 210 preferably is retained within its own insulation shell 220 and surrounded by an evacuated insulation chamber 240. The evacuated region G surrounds the thermal mass 210 within the thermal battery outer wall 230 to further enhance insulation of the thermal mass 210. An exit port 224 preferably is provided in the insulation shell 220.

In as much as the preferred embodiment describes a reciprocal motion of the piston, one skilled in the art can deduce that a rotary configuration of the piston and cylinder can also be used with the invention. The rotary engine uses the pressure created when Expansion fluid EF is heated by thermal mass 210 and expands by phase change. In the case when a combustible expansion fluid EF is used, a spark plug 68 provided the ignition for the fuel to cause the rapid expansion of Expansion fluid EF. The repeating of this cycle causes a continuous output of power to drive shaft 64.

In general operation of the engine 10, heat is stored in the thermal battery 200 which may consist solely of a thermal mass 210 capable of storing heat such as by passing electric current through resistance heating elements 212 embedded in the thermal mass 210, which preferably includes the engine block 40 itself, the engine is started (the crankshaft 112 is rotated), the intake valve port 52 is opened, the expansion fluid delivery means 90 delivers a quantity of expansion fluid EF into the cylinder 20 and then closes, and the heat stored in the thermal battery 200 either causes or assists the expansion fluid EF to expand within the cylinder 20, whether by phase change or by combustion, pushing the piston 30 from a position at or near top dead center to bottom dead center, thereby rotating the crankshaft 112 and producing mechanical energy. The exhaust valve 56 then opens and continued angular momentum and rotation of the crankshaft 112 and flywheel 110 drives the piston 30 back toward the cylinder head 50, pushing the remaining elements of the expansion fluid EF out of the cylinder 20 so that the intake valve port 52 can again open and the exhaust valve 56 close and the cycle repeat.

Method

Figure 8:
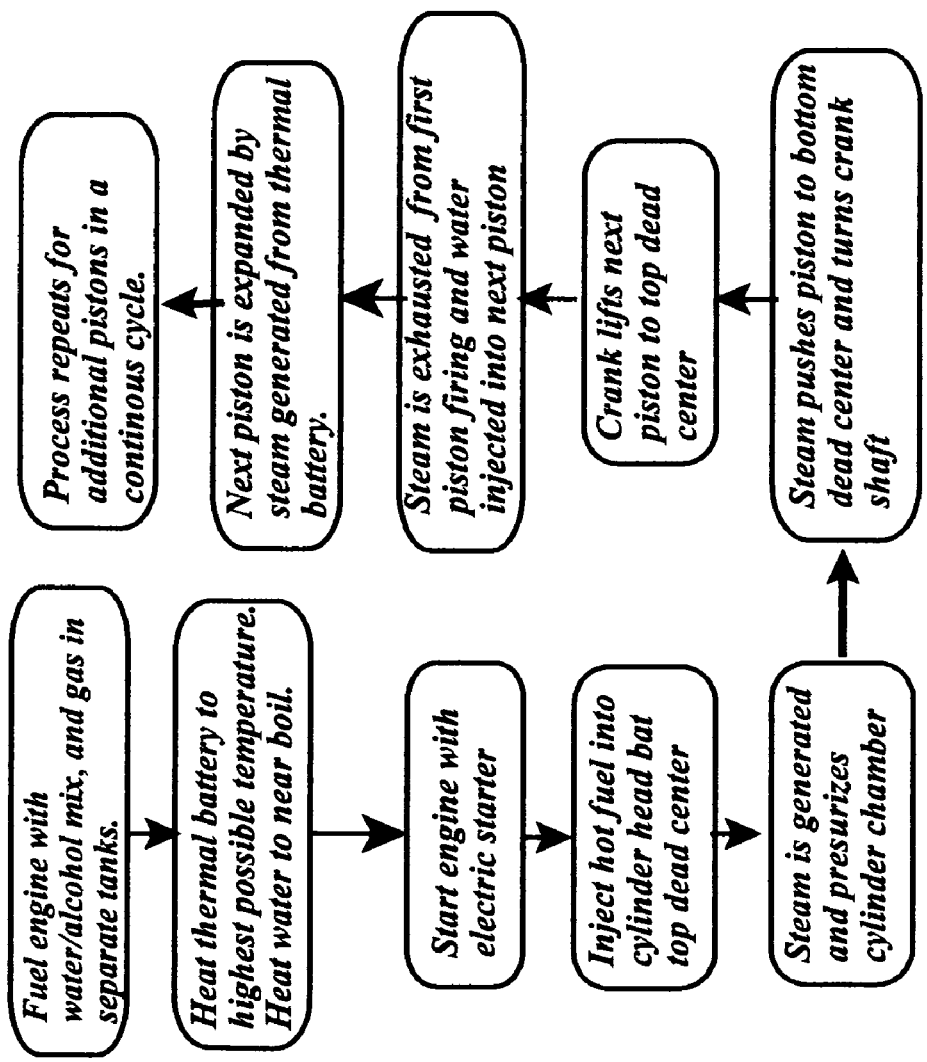
FIG. 8 is a flow chart of the steps of engine operation using a non-combustible expansion fluid.
Figure 9:
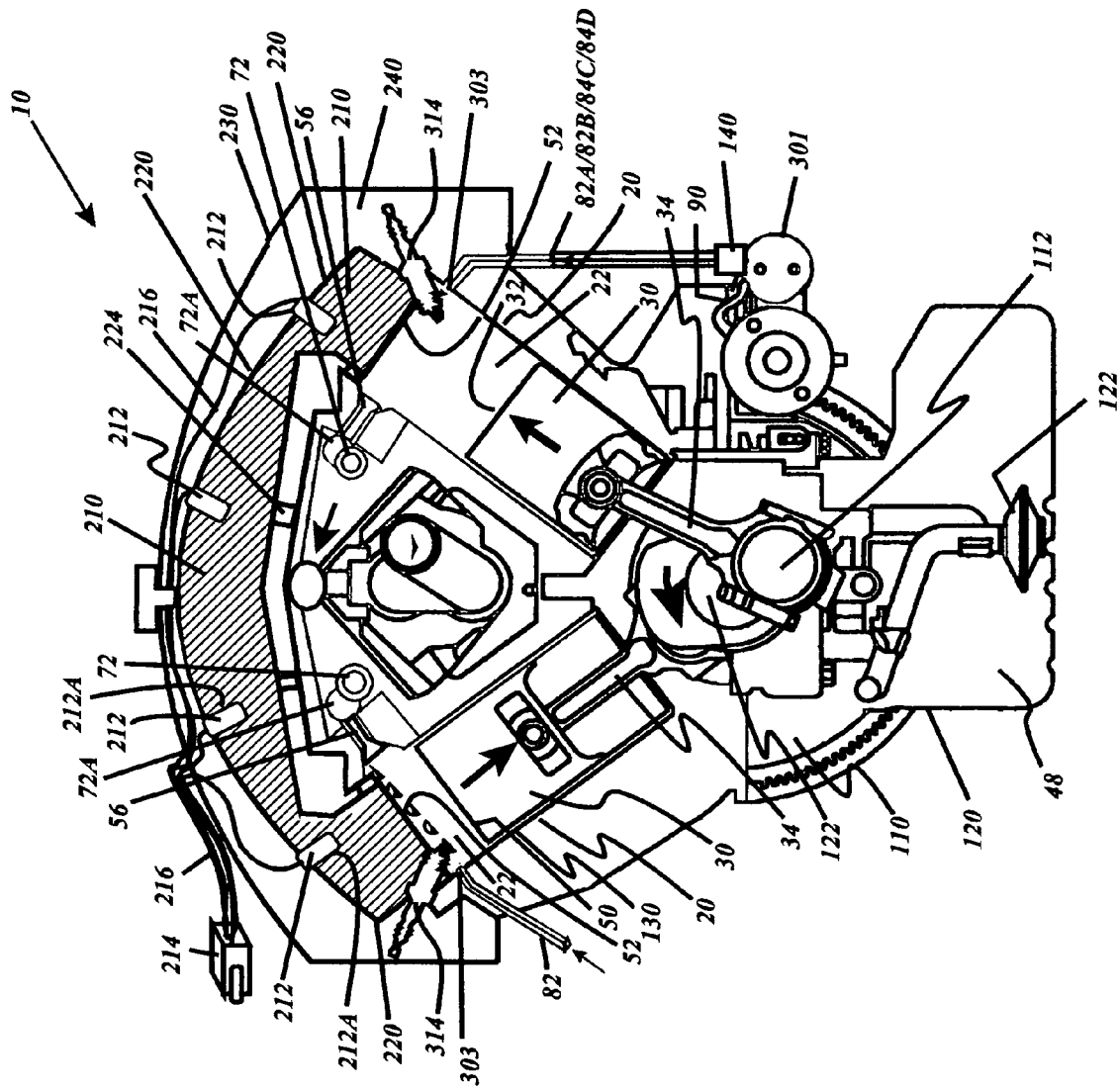
FIG. 9 is a cross-sectional end view of a V-configuration embodiment of the present engine, having two cam shafts and a thermal battery including a thermal mass having outward surfaces covered by a thermal insulation shell inside an evacuated chamber.
Figure 10:
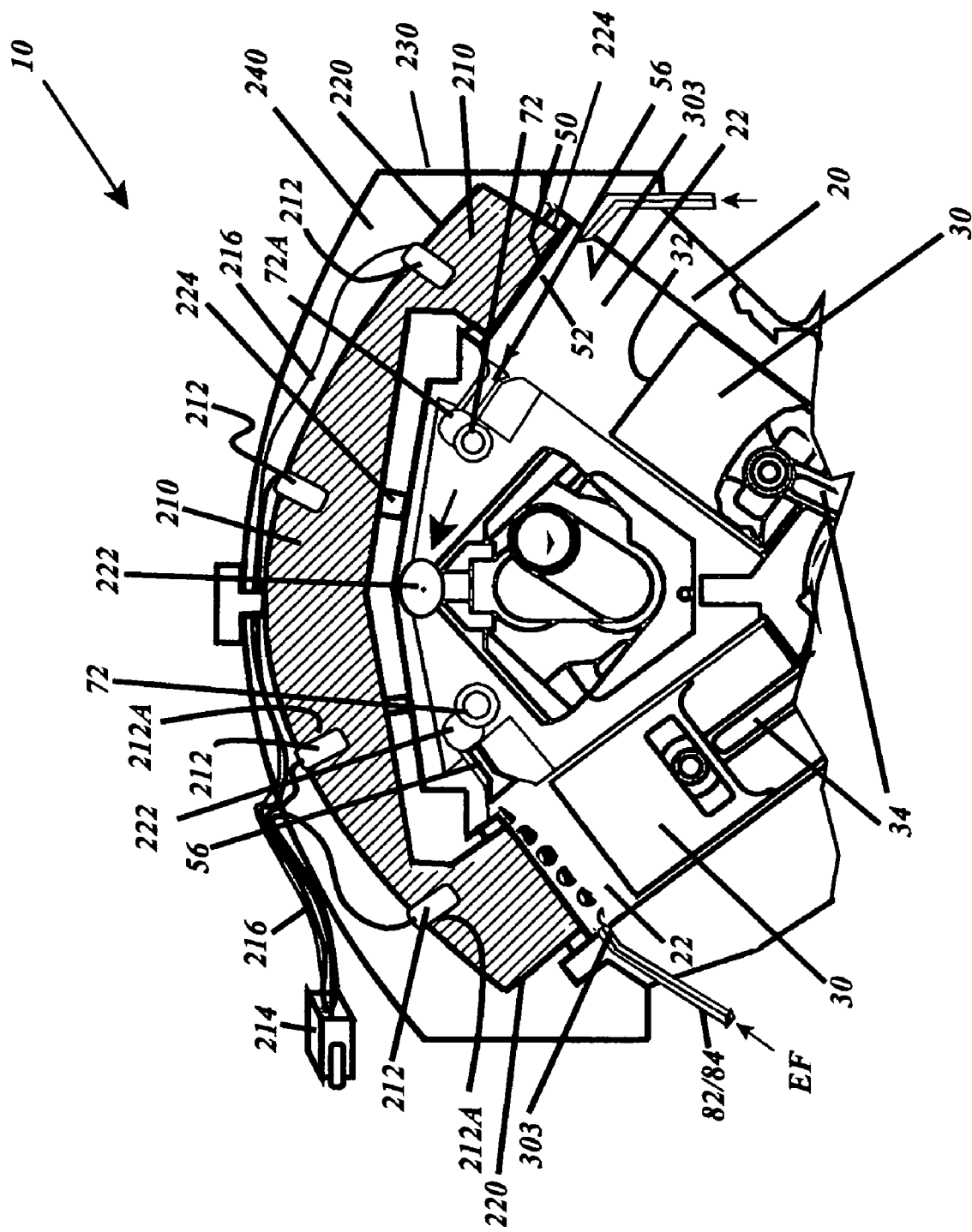
FIG. 10 is a broken away end view of the upper portion of the engine as shown in FIG. 9.
Figure 11:
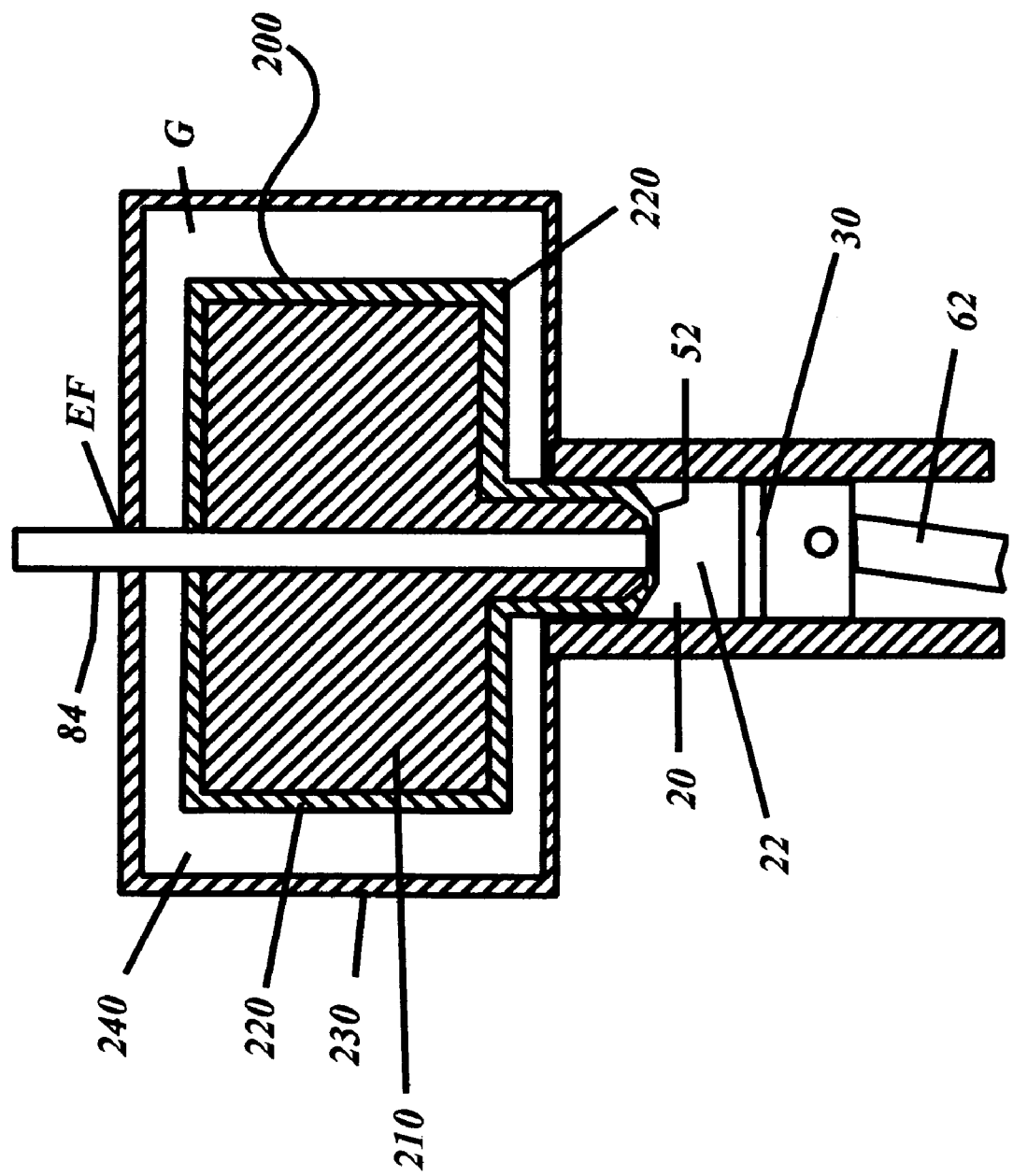
FIG. 11 is a schematic cross-sectional profile of a version of the present engine in which the cylinder head and cylinder are the thermal mass, such as for smaller engines used in lawn mowers and children's toys.
Figure 12:
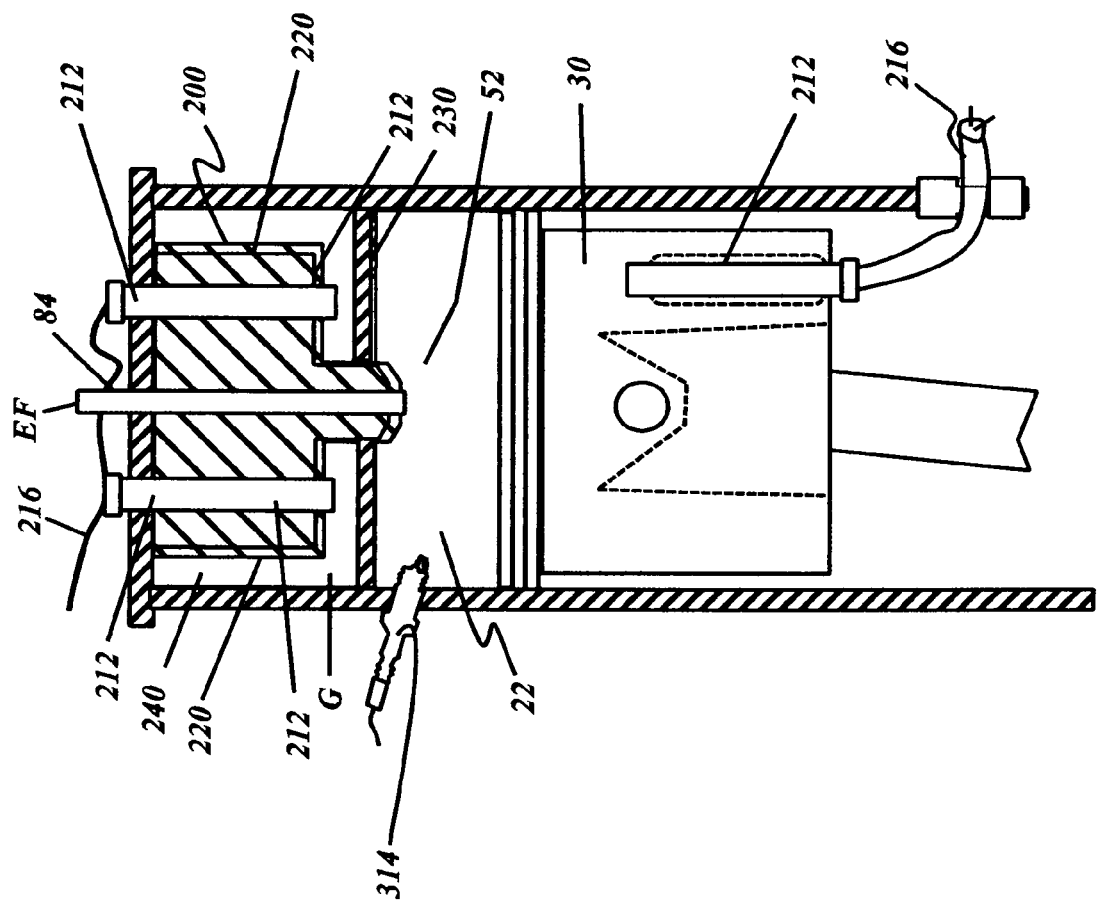
FIG. 12 is a view generally as in FIG. 11, but with a heating element provided within the piston so that the piston becomes part of the thermal mass or the entire thermal mass.

In practicing the invention, the following method may be used. One embodiment of the present thermal engine 10 operates for example according to the following steps, as illustrated in FIG. 8: fueling the engine 10 with water and alcohol mix Expansion fluid EF; heating the thermal mass 210 to the highest possible temperature to store energy within thermal battery 200; starting engine 10 with an electric starter 66; injecting hot fuel Expansion fluid EF into cylinder head 50 at top dead center; super-heated expanded vapor is generated to pressurize the cylinder chamber 22; repeating the process for additional pistons 30 in a continuous cycle; driving the piston 30 with expanded vapor generated by the thermal heating of Expansion fluid EF using thermal battery 200; exhausting the expanded vapor of expansion fluid EF from first piston 30 firing and injecting a liquid, preferably water with and alcohol mix expansion fluid EF into next piston 30; the crankshaft 112 lifting next piston 30 to top dead center; and water with and alcohol mix expanding by absorbing heat from the thermal batter 200, pushing piston 30 to bottom dead center and turning the crankshaft 112.

Figure 18:
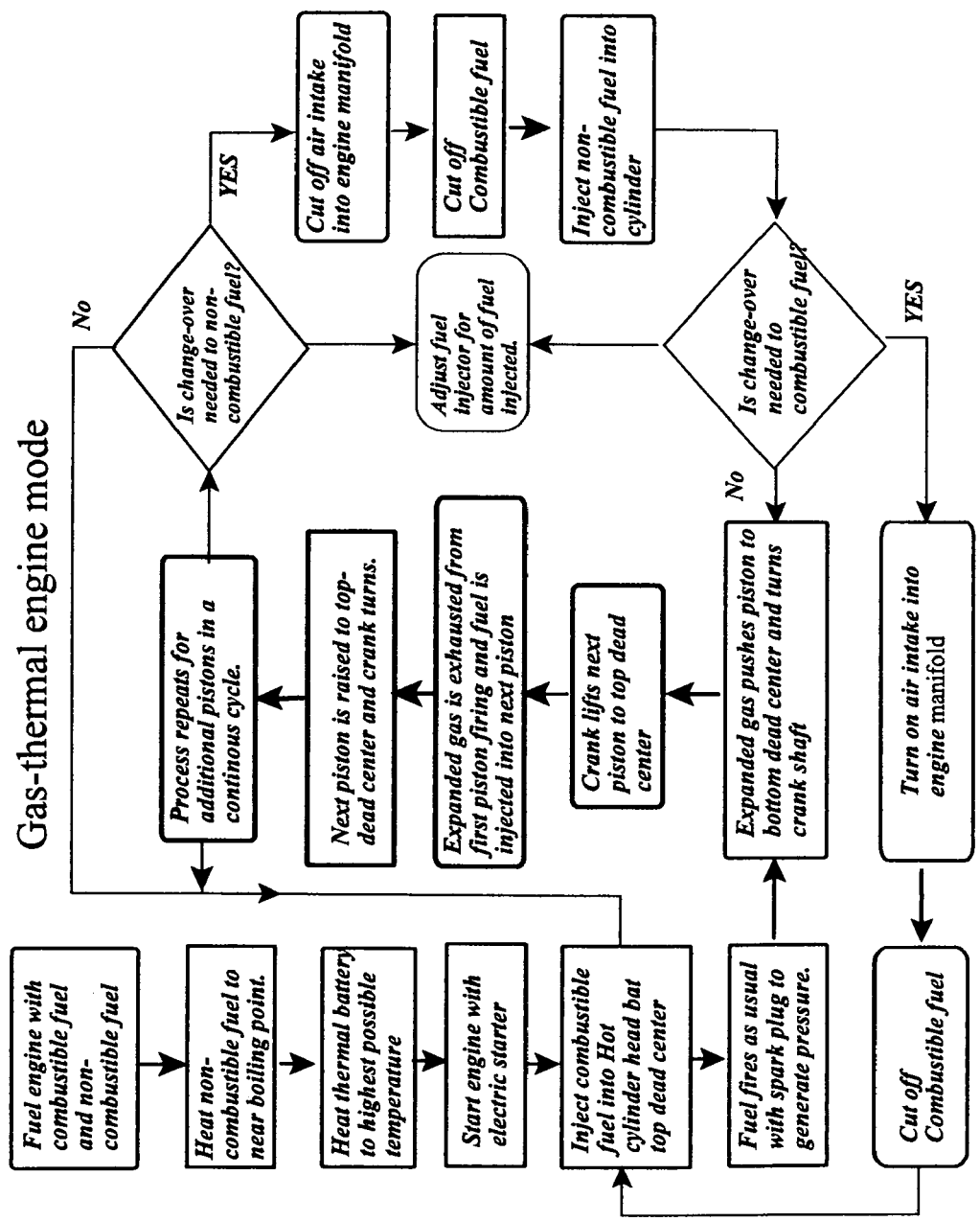
FIG. 18 is a flow chart of the steps of engine operation in which the engine can switch between combustible and non-combustible expansion fluids.

An example of steps of engine 10 operation in the combustion mode as illustrated in FIG. 18 is as follows: fueling engine 10 with a gas mixture Expansion fluid EF; heat thermal battery 200 to the highest possible temperature; starting the engine 10 with the electric starter 66; injecting hot fuel Expansion fluid EF into hot cylinder head 50 at top dead center; the fuel expansion fluid EF firing with a spark plug 68 to combust and burn Expansion fluid EF and generate pressure within the cylinder expansion chamber 22 to drive the piston 30; repeating the process for additional pistons in a continuous cycle; heating the next piston 30 with the thermal battery 200 and then combusting the fuel EF with a spark plug 68; exhausting burnt fuel EF from first piston 30 firing and injecting fuel EF into the next piston 30; crank 34 lifts next piston 30 to top dead center; and the exploded Expansion fluid EF pushing the piston 30 to bottom dead center and then turning crankshaft 112.

Some engine constructions of this embodiment may not need a spark plug 68 to ignite the Expansion fuel EF, since the heat from the thermal battery 200 may be sufficiently high to automatically ignite the Expansion fuel EF.

Figure 19:
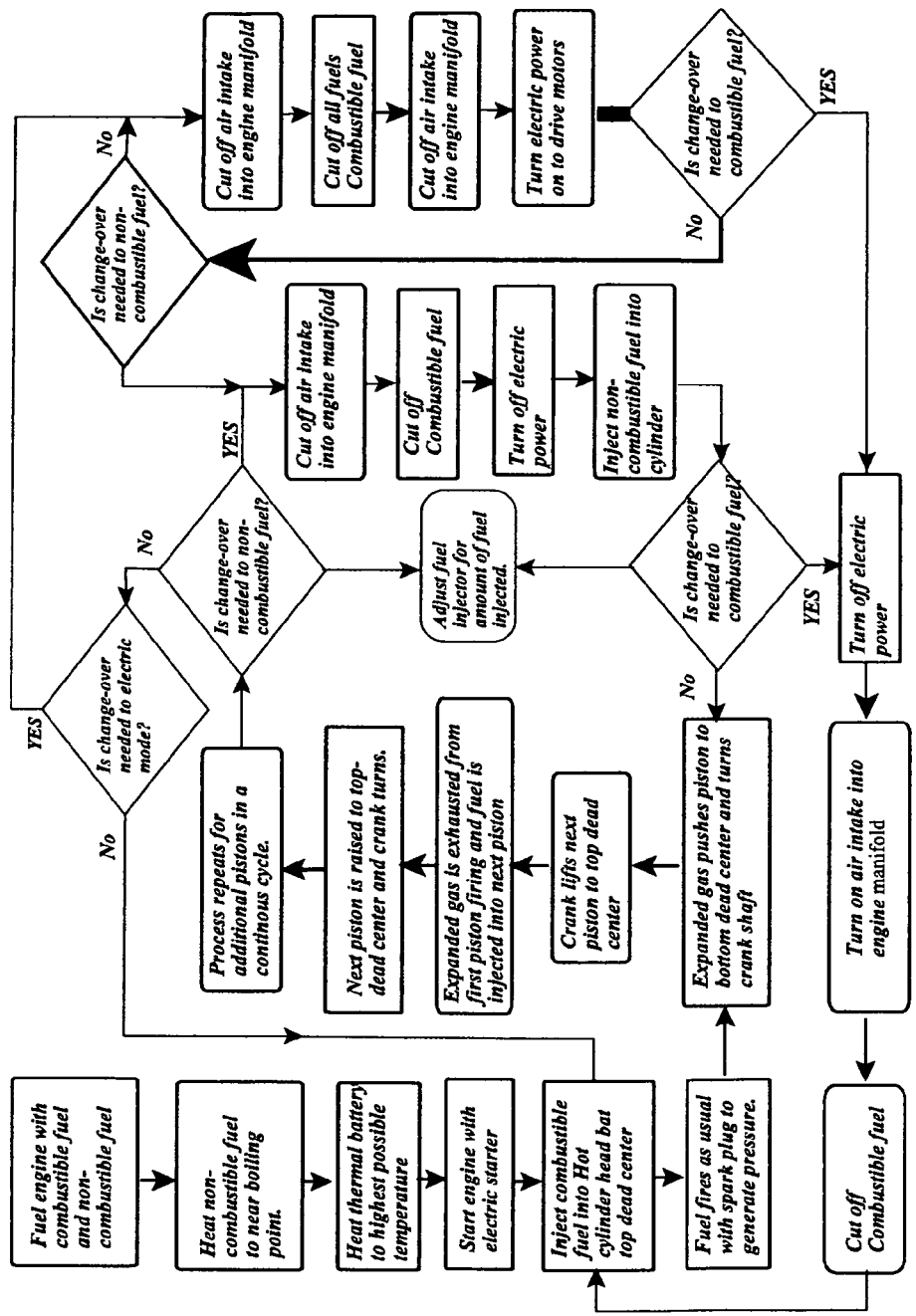
FIG. 19 is a flow chart of the steps of engine operation in which the engine can switch among combustible and non-combustible expansion fluids modes and electric motor operation mode.

An example of steps of engine 10 operation in the gas-thermal engine mode are is illustrated in FIG. 19. An example of steps of engine 10 operation in the gas-thermal engine-electric mode is illustrated in FIG. 19.

Additional Description

In the case when the engine is used with a combustible fuel Expansion fluid or a non-combustible liquid Expansion fluid EF, an air-intake switching valve is incorporated. This air-intake switching valve regulates the inflow of intake air into the cylinder, so that in the case when only a non-combustible phase change Expansion fluid EF is used, the air-intake can be closed, so that no air enters the cylinder heads of the engine. Air is only required when a combustible Expansion fluid EF is a fuel such as gasoline or ethanol, that may be used with the engine.

In the case when the engine is constructed only to use a phase change liquid such as water as an Expansion fluid EF, no air-intake is necessary and the air-intake switching valve may be eliminated. This is the case of when the engine is used any in low power applications, such a lawn mowers, golf-cars, toys, motor cycles and electric hybrid automobiles.

In the case when the engine can be used to generate both electric and mechanical energy, the thermal mass 210 is a molten electrolyte BE made from molten metal such as aluminum or lithium alloys. The electrolyte BE can then be a salt, such as a Lithium salt. In such a case, the lithium may be molten as an alloy with a silicate or aluminum, or pure aluminum metal and held in a matrix of another metal such as iron. Molten salts with high melting points are used as the electrolytes in conventional electric thermal batteries, while at the same time the matrix of molten salts act as a thermal mass 210 for thermal energy to generate the vaporization energy needed to expand Expansion fluid EF to drive the engine 10.

In most conventional electric thermal batteries, the negative electrode is molten sodium salts, while the positive electrode is a nickel or chromium salt in the charged state. Advantageously, the thermal battery 200 of the present invention is used to generate both electricity and thermal energy, so that it can be used to power an engine and a motor by using both Expansion fluids and electric energy respectively. The use of nickel and nickel chloride as electrolytes is also suitable and well established for this purpose, and thus, the advantages of keeping the electrolytes BE in a molten state establishes the present electric embodiment of the thermal battery 200 as an improvement over prior electric thermal batteries, and the present thermal battery 210 additionally uses its stored heat energy to enhance expansion of an Expansion fluid EF in an engine cylinder to increase engine power and efficiency. Since nickel and nickel chloride are almost insoluble in acid neutral and basic salts, intimate contact of the molten salts can occur without much loss of efficiency. Since both $NaAlCl_4$ and Na are liquid at the engine operating temperatures, a sodium-alumina ceramic is used to separate the liquid sodium from the molten $NaAlCl_4$. This type of electric battery was invented in 1985 by a group led by Dr. Johan Coetzer at the CSIR in Pretoria, South Africa.

The present invention uses a thermal battery 200 which may or may not utilize this invention as an energy source. Thus, the electrical energy could be used when needed, or the thermal energy may be used in its stead. Also, the present thermal battery 200 operates at much higher temperature than conventional prior art thermal electric batteries. Conventional batteries are limited to a maximum of about 400 degrees F. while the present thermal battery may have a temperature range as low as 400 degrees F. to as high as 2000 degrees F. to operate. The higher temperature requirement of the present thermal battery 200 in its electric embodiment causes the battery to store enough heat energy to provide additional mechanical power by evaporation of an Expansion fluid EF.

Advantageously, the present thermal battery 200 consists of a highly insulated storage shell 220 for holding heated salts or metals an electrolytes BE which is encased within an evacuated chamber 240 for preventing a loss of heat to the environment. These heated salts and metals also may be in a molten or highly heated solid state also, so that, they can be incorporated as electrolytes BE to additionally act as a conventional electric thermal batteries. Thus, the present invention functions primarily as a thermal energy source but additionally functions as an electrical energy source for powering engines. During the heat charging of the present thermal battery 200, electric energy is directed into the insulated electrolyte BE thermal mass by heating electrodes, 212, so that the metals and other elements within the thermal battery 200 can be heated to very high temperatures. The metals and salts that act as heat storage medium for thermal mass 210 can also be in a molten state. Then, the present thermal battery 200 preferably can simultaneously serve to store thermal and electrical energy for later use when needed to power the engine by mechanical and electrical means respectively. The incorporation of molten salts and metals into the present invention only serves to act as a thermal battery 200 heat storing system for evaporation of an Expansion fluid EF to a vapor while preferably providing a means to generate high electric currents to power auxiliary electric motors 300 if needed. The combination of these two energy sources in the present invention is unique.

Thus, the thermal battery 200 serves to power an engine 10 by a thermal transfer of energy, and in recognition of the fact that molten salts can be used instead of ordinary substances, the present thermal battery 200 also serves as an electric power pack without compromising the advantages and enhanced function of the present invention.

Suffice to say that one skilled in the art would appreciate that the temperatures needed to store enough thermal energy to thermally power an engine by phase change of an expansion fluid to a vapor must be very high indeed and far exceed the maximum requirements of conventional electric thermal batteries. This high temperature can be achieved by storing a molten metal in a ceramic or cast iron electrolyte chamber. So the insulation shell 220 can be made from a ceramic foam, such as Rescor™ 902 Alumina Silicate or Duocel® Silicon Carbide Foam. There exist several such insulators suitable for this purpose.

The entire engine block 40 preferably serves as a thermal battery 200 when properly insulated. In all cases, only high temperature bearings and fittings should be used in the design of the present engine. In addition, when used with a conventional combustible fuels, the additional heat generated by combustion is stored in the engine block 40 and then used if needed to act as a thermal battery for powering the engine using the phase change of a non-combustible liquid Expansion fluid EF such as water into its vapor state.

The thermal battery 200 can then be charged over a period of time when not in use so that the stored thermal energy can be used when needed. When used with an Expansion fluid EF that is a conventional combustible fuel, a spark plug 68 may be incorporated as in a conventional combustion engine. The spark plug 68 ignition can then be annulled when the engine is used with the non-combustible expansion fluid in the phase change mode. Because of the high temperature of the present thermal battery, very little combustible fuel is used during full engine operation, and in fact the combustible Expansion fluid EF can be supplemented with a non-combustible Expandable fluid EF such as water without loss of efficiency.

When the engine is required to operate in a low power mode, such as during cruising of a vehicle, the Expansion fluid EF mode preferably can be changed from a combustible fluid mode to a non-combustible fluid mode using a liquid Expansion fluid EF such as water. In this embodiment, a regulating electronic controller 86 changes the fuel lines over from combustible Expansion fluid EF to non-combustible Expansion fluid EF, automatically.

The present invention consists of a thermally powered engine 10 using a thermal mass 210 and a fuel Expansion fluid EF as a source of power.

The thermal battery 200 may be part of the thermal mass of the engine 10, or it may be a separate adaptation for existing engines. The thermal battery 200 is essentially a thermal mass 210 with a high heat absorption capacity made from a suitable metal such as aluminum alloys or cast steel alloys.

The thermal load or thermal mass 210 is heated to a very high temperature that is at most 80 percent of the melt-point of the thermal mass 210 material used.

In the case of aluminum, it may be heated to 1500 degrees F. In the case of steel, it may be heated to 2000 degrees F.

In the case of a ceramic, the thermal mass 210 it may be heated to 2500 degrees F.

The engine casing can also be part of the thermal load or thermal mass 210.

The thermal mass 210 is highly insulated to prevent heat loss to the environment.

Suitable insulating materials are: Ceramic foams which may also be molded directly around the engine block 40. Fiber foams of high temperature can also be uses to encapsulate engine thermal mass 210.

In the case when the thermal mass 210 is separated from the engine block 40, the thermal mass 210 may be encapsulated in its own chamber by insulation shell 220, which may be surrounded by a vacuum, G in the manner of a thermos flask.

Figure 14:
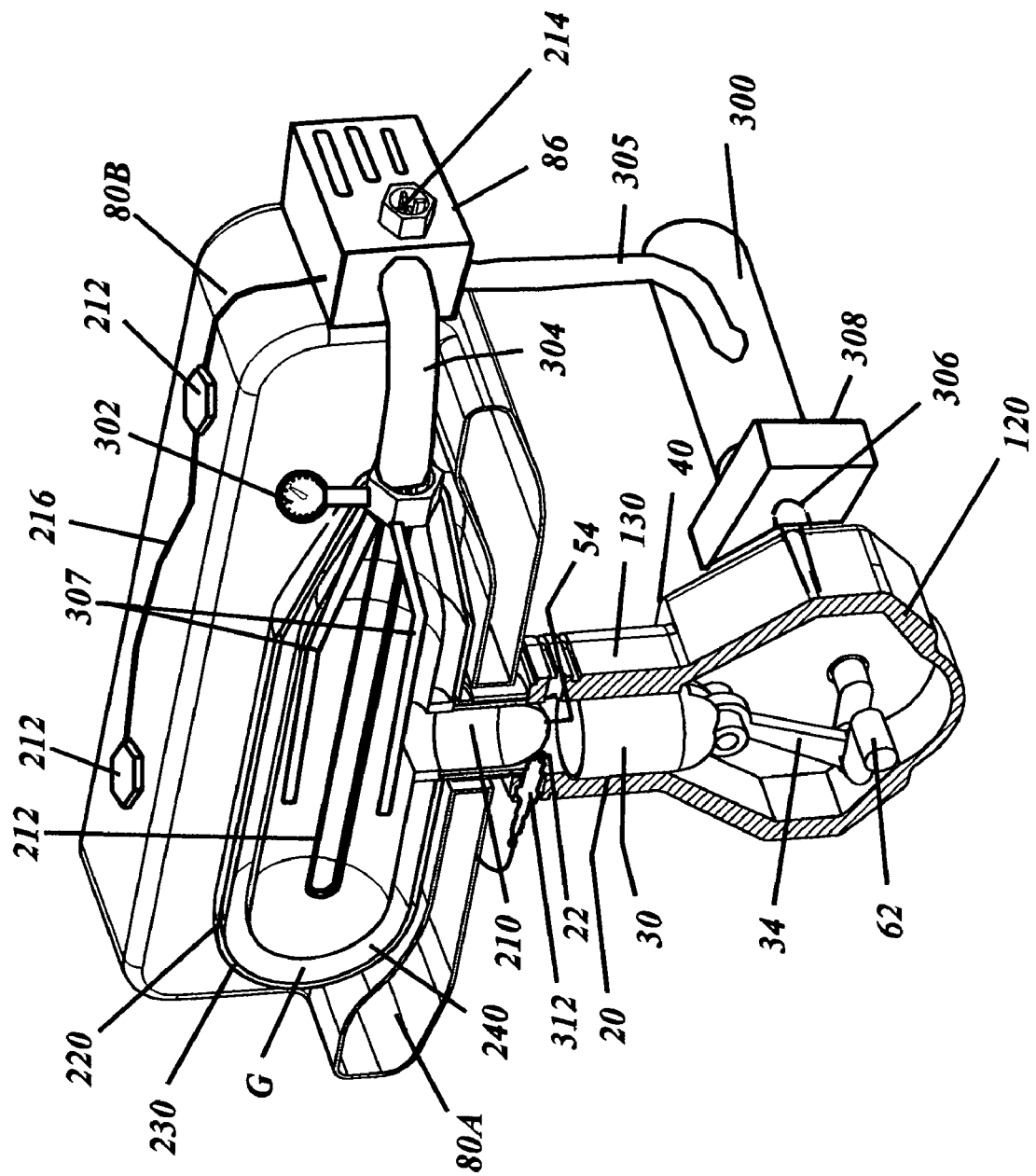
FIG. 14 is a cross-sectional perspective view as in FIG. 13 of the engine incorporating the electric thermal battery as a thermal mass of the present invention.
Figure 15:
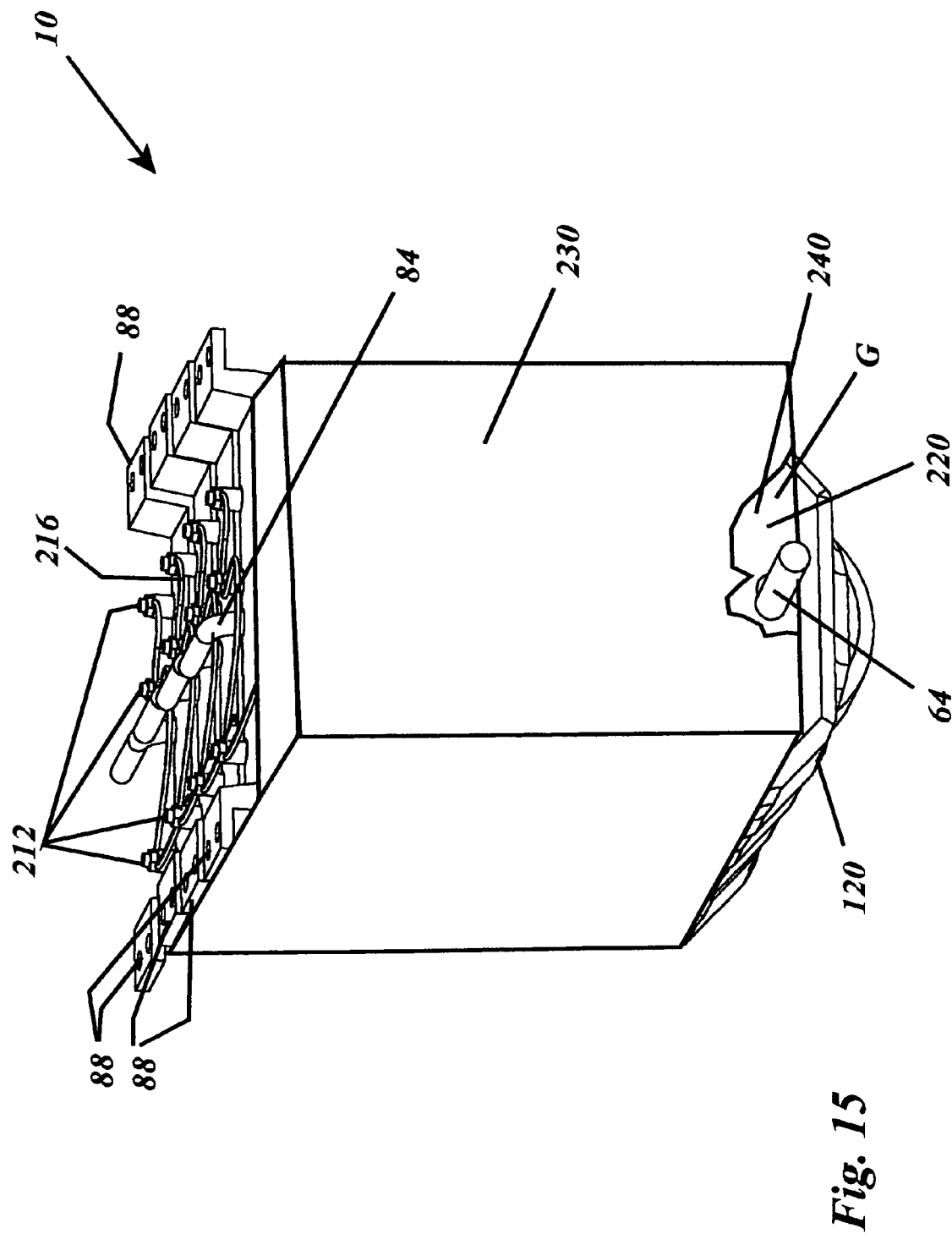
FIG. 15 is another cross-sectional view of the adapted prior art thermal battery and engine of FIG. 13, encased in an insulated shell.
Figure 16:
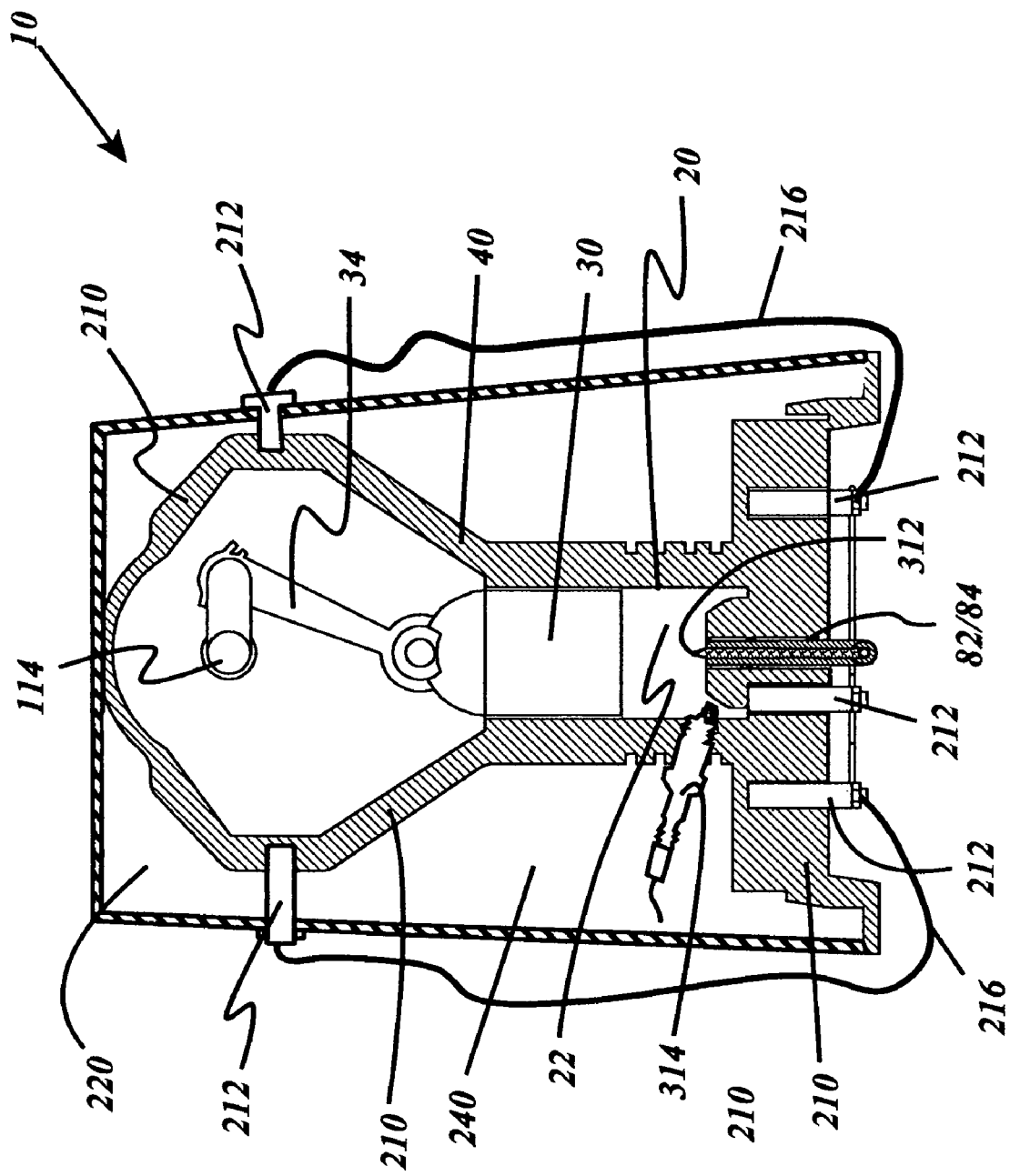
FIG. 16 is a view as in FIG. 1 with the engine block also acting as a thermal mass, and the an outer housing or cylinder case added around the interconnected cylinder casings, in which the housing is formed of insulating material to form a thermal insulation shell.
Figure 17:
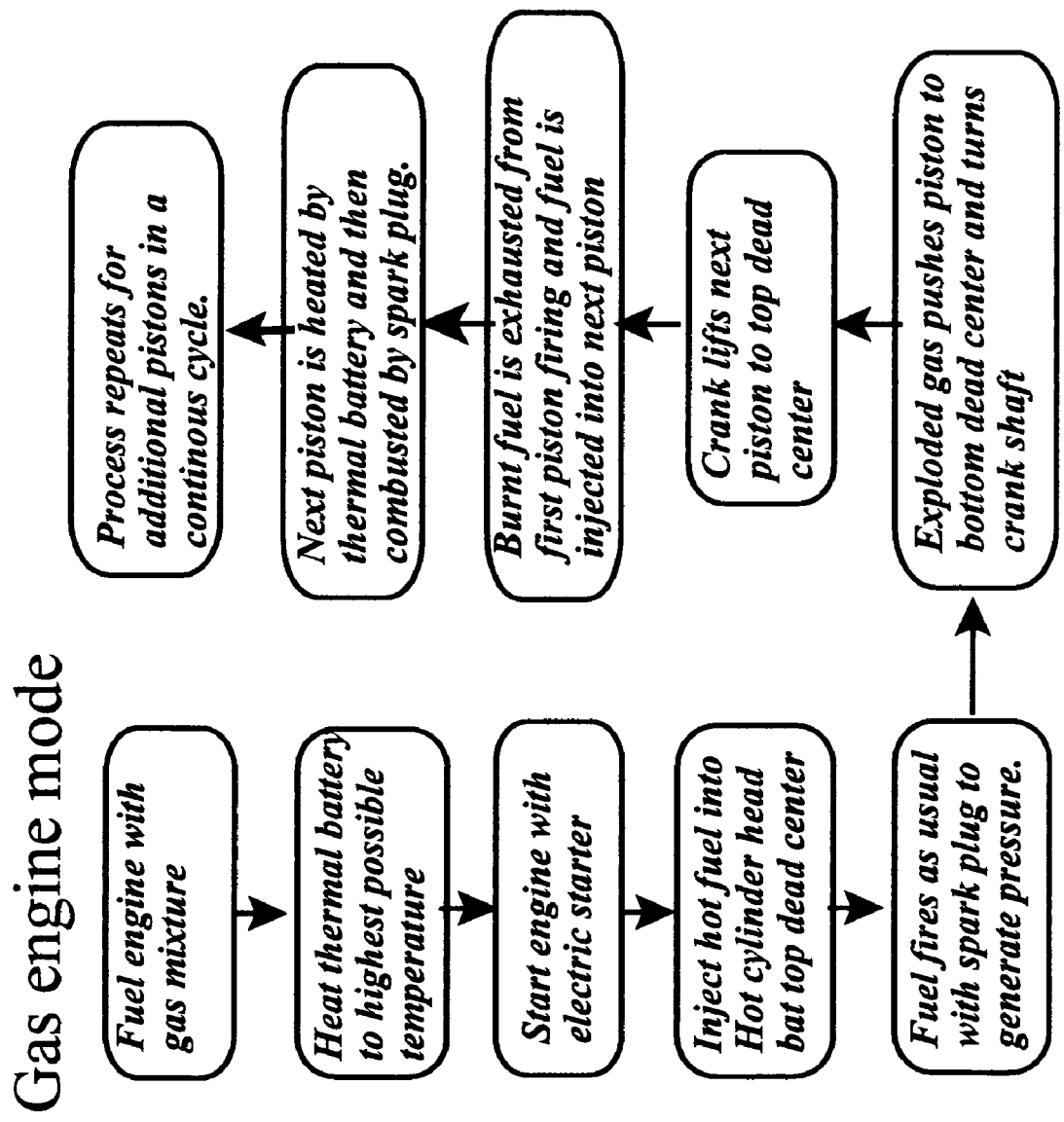
FIG. 17 is a flow chart of the steps of engine operation using a combustible expansion fluid.

The thermal mass 210 can be a liquified metal such as lead, aluminum, lithium or silica. In such a case, the thermal mass 210 is encapsulated in a ceramic flask or insulation refractive shell 220 as shown in FIGS. 14 and 15.

The charging of the thermal mass 210 is preferably through electric heating elements that will slowly raise the temperature from an external electric power source.

The electric connections can be external to a vehicle for example so that one could plug-in the vehicle to be charged overnight.

The insulation shell 220 should keep the engine 10 very hot at all times, so that the thermal load or thermal mass 210 will have maximum efficiently.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A thermal engine, comprising:
a piston with a piston head and a piston crank;
an engine block made crank case and a cylinder case and containing a tubular cylinder within which said piston head is slidably retained;
a cylinder head comprising intake and exhaust valve port means and valve means and defining an expansion chamber within said cylinder between said piston head and said cylinder head;
a crankshaft mechanically linked to said piston crank opposite said cylinder head by said piston crank;
valve operating means;
an expansion fluid tank; a heating means for heating expansion fluid in said expansion fluid tank; thermal insulation surrounding said expansion fluid tank;
fluid delivery means for delivering an expansion fluid from said expansion fluid tank into said expansion chamber;
a thermal battery comprising a thermal mass for storing heat and being in thermal communication with said expansion chamber for heating expansion fluid within said expansion chamber; a means of heating said thermal battery;
thermal insulation surrounding said thermal battery for efficiently containing heat within said thermal mass for delivery into said expansion chamber;
and engine starting means;

such that when said engine starting means starts said engine, said valve means opens said intake and exhaust means, the expansion fluid delivery means delivers a quantity of expansion fluid into said expansion chamber and then closes, and the heat stored in said thermal battery one of: causes and assists the expansion fluid to expand within said cylinder, whether by phase change or combustion, pushing said piston head from a position substantially at top dead center to bottom dead center, thereby rotating said crank shaft and producing mechanical energy.

2. The thermal engine of claim 1, wherein said valve operating means is driven by rotation of said drive shaft.

3. The thermal engine of claim 1, wherein said valve operating means comprises a cam shaft and said valves ride on cams along said cam shaft.

4. The thermal engine of claim 1, additionally comprising:
a flywheel attached to said crankshaft and centered at the rotational axis of said crankshaft;
and an output shaft coaxial with and fixedly connected to an end of said crankshaft extending out of the crankcase through a shaft port to transmit engine power in the form of torque to a desired mechanical load.

5. The thermal engine of claim 1, wherein said expansion fluid delivery means comprises a fuel injection system.

6. The thermal engine of claim 1, additionally comprising:
thermal mass heating means comprising at least one resistance heating element extending into said thermal mass and a heating element circuit;
and an element power source for delivering electric current through said at least one heating element and thereby heating said thermal mass.

7. The thermal engine of claim 1, wherein said thermal mass comprises said engine block.

8. The thermal engine of claim 1, wherein said engine operates alternately on a combustible expansion fluid and on a noncombustible expansion fluid, said engine additionally comprising:
ignition means in communication with said chamber for igniting a combustible fuel within said expansion chamber;
and a combustible fluid tank and a noncombustible fluid tank, which are each alternately and respectively in fluid communication with said fuel injection system through a combustible fluid line and fluid pump and a noncombustible fluid line and fluid pump;
such that when greatest power is needed, said engine is driven by ignition of combustible expansion fluid, and by phase change of noncombustible expansion fluid when less power is needed.

9. The thermal engine of claim 1, wherein said thermal battery comprises an electric thermal battery containing a battery electrolyte, and said engine alternately operates when less power is needed on a motor driven by electric power stored in the battery electrolyte; and such that the thermal energy stored within said electrolyte can also be used to cause a phase change of noncombustible expansion fluid to generate more mechanical energy when needed.

10. The thermal engine of claim 1, additionally comprising an engine block comprising a cylinder case surrounding said cylinder and a crankcase surrounding said crankshaft.

11. The thermal engine of claim 10, additionally comprising a sump at the lower end of said crankcase.

12. The thermal engine of claim 9, wherein said thermal battery comprises a cylinder head in the form of a block of thermal mass material and comprises a thermal protrusion sized and positioned to extend into said expansion chamber for efficiently transferring heat into said expansion chamber.

13. The thermal engine of claim 9, wherein said thermal battery is contained within an insulation shell formed of thermally insulating material, where thermal battery spacers extend between and maintain a gap between said insulation shell and said thermal battery for providing added thermal insulation.

14. The thermal engine of claim 1, comprising a plurality of said electric heating elements extend into thermal block ports in said thermal mass and are connected to an electric power source through a heating element circuit.

15. The thermal engine of claim 1, additionally comprising a fluid feed line extending from an expansion fluid source to a fluid injection spray valve chamber portion of the cylinder.

16. The thermal engine of claim 1, wherein said valve operating means is an electronic controller.

17. The thermal engine of claim 1, wherein exhausted expansion fluid is cooled and recycled.

18. A method of operation of a thermal engine comprising a piston with a piston head and a piston crank; an engine block made crank case and a cylinder case and containing a tubular cylinder within which said piston head is slidably retained; a cylinder head comprising intake and exhaust valve port means and valve means and defining an expansion chamber within said cylinder between said piston head and said cylinder head; a crankshaft mechanically linked to said piston crank opposite said cylinder head by said piston crank; valve operating means; an expansion fluid tank; a heating means for said expansion fluid tank; fluid delivery means for delivering an expansion fluid from said expansion fluid tank into said expansion chamber; a thermal battery comprising a thermal mass for storing heat and being in thermal communication with said expansion chamber for heating expansion fluid within said expansion chamber; thermal insulation surrounding said thermal battery for efficiently containing heat within said thermal mass for delivery into said expansion chamber; thermal insulation surrounding said expansion fluid tank for efficiently containing heat within said expansion fluid; and engine starting means, comprising the steps of:
fueling the engine with water expansion fluid;
heating the thermal battery to the highest possible temperature; heating the expansion fluid to a temperature close to and below its boiling point; starting the engine;
injecting hot fuel expansion fluid into cylinder head at top dead center;
steam is generating steam to pressurize the cylinder chamber;
repeating the process for additional pistons in a continuous cycle;
driving the piston with expanded steam generated from thermal battery;
exhausting steam from first piston firing and injecting water into the next piston;
the crankshaft lifting the next piston to top dead center;
and steam pushing piston to bottom dead center and turning the crankshaft.

19. A thermal engine, comprising:
a rotary piston with a sun gear; a drive shaft with a moon gear; said moon gear mechanically coupled to said sun gear; a shaft mechanically linked centrally to said moon gear;
an engine block crank case and a cylinder case; said cylinder case such that when said rotary piston is rotatably and slidingly configured within said cylinder case, said cylinder case partitioned into three chambers such that one chamber is fluidly connected by an intake valve port means to an expandible fluid source and another of these chambers is fluidly connected to the atmosphere by an exhaust valve port means;
valve operating means;
an expansion fluid tank;
fluid delivery means for delivering an expansion fluid from said expansion fluid tank into said expansion chamber;
a thermal battery comprising a thermal mass for storing heat and being in thermal communication with said expansion chamber for heating expansion fluid within said expansion chamber;
thermal insulation surrounding said thermal battery for efficiently containing heat within said thermal mass for delivery into said expansion chamber; thermal insulation surrounding said expansion fluid tank for efficiently containing heat within said expansion fluid;
and engine starting means;
such that when said engine starting means starts said engine, said valve means opens said intake and exhaust means, the expansion fluid delivery means delivers a quantity of expansion fluid into said expansion chamber and then closes, and the heat stored in said thermal battery and expansion fluid, one of: causes and assists the expansion fluid to expand within said cylinder, whether by phase change or combustion, rotates said piston head, thereby rotating said shaft and producing mechanical energy.

20. A thermal engine, comprising:
a piston with a piston head and a piston crank;
an engine block made crank case and a cylinder case and containing a tubular cylinder within which said piston head is slidably retained;
a cylinder head comprising intake and exhaust valve port means and valve means and defining an expansion chamber within said cylinder between said piston head and said cylinder head;
a crankshaft mechanically linked to said piston crank opposite said cylinder head by said piston crank;
valve operating means;
an expansion fluid tank; thermal insulation surrounding said expansion fluid tank for efficiently containing heat within said expansion fluid;
fluid delivery means for delivering one of: a combustible expandible fluid and a non-combustible expansion fluid from one of: a combustible expansion fluid tank and a non-combustible expansion fluid tank into said expansion chamber;
said piston having a thermal battery comprising a thermal mass for storing heat and being in thermal communication with said expansion chamber for heating expansion fluid within said expansion chamber; said thermal mass having electric heating elements thereof for heating;
thermal insulation surrounding said thermal engine for efficiently containing heat within said thermal mass for delivery into said expansion chamber;
and engine starting means; a spark plug for starting a combustion of said combustible expansion fluid;
such that when said engine starting means starts said engine, said valve means opens said intake and exhaust means, the expansion fluid delivery means delivers one of: a quantity of combustible expansion fluid into said expansion chamber and then closes, and the spark plug causes and assists the expansion fluid to expand within said cylinder by means of combustion.

21. A method of operating a thermal engine comprising: a rotary piston with a sun gear, a drive shaft with a moon gear; said moon gear mechanically coupled to said sun gear; a shaft mechanically linked centrally to said moon gear; an engine block crank case and a cylinder case; said cylinder case such that when said rotary piston is rotatably and slidingly configured within said cylinder case, said cylinder case partitioned into three chambers such that one chamber is fluidly connected by an intake valve port means to an expansion fluid source and another of these chambers is fluidly connected to either the atmosphere or a cooling coil by an exhaust valve port means;
valve operating means;
an expansion fluid tank;
fluid delivery means for delivering an expansion fluid from said expansion fluid tank into said expansion chamber;
a thermal battery comprising a thermal mass for storing heat and being in thermal communication with said expansion chamber for heating expansion fluid within said expansion chamber;
thermal insulation surrounding said thermal battery for efficiently containing heat within said thermal mass for delivery into said expansion chamber;
and engine starting means;
such that when said engine starting means starts said engine, said valve means opens said intake and exhaust means, the expansion fluid delivery means delivers a quantity of expansion fluid into said expansion chamber and then closes, and the heat stored in said thermal battery one of: causes and assists the expansion fluid to expand within said cylinder, whether by phase change or combustion, rotates said piston from a position wherein said expansion chamber is of minimal volume to a position of maximal volume thereby rotating said sun gear and producing mechanical energy; said sun gear rotating said moon gear to transfer power to said drive shaft; a quantity of expansion fluid into said expansion chamber and then closes, and the thermal mass causes and assists the expansion fluid to expand within said cylinder by means of a phase change, rotating said piston from a position wherein said expansion chamber is of minimal volume to a position of maximal volume thereby rotating said sun gear and producing mechanical energy; said sun gear rotating said moon gear to transfer power to said drive shaft pushing said piston head from a position substantially at top dead center to bottom dead center, thereby rotating said crank shaft and producing mechanical energy; further comprising the steps of:
fueling the engine with a gas mixture expansion fluid;
heating the thermal battery;
starting the engine with the electric starter;
injecting hot fuel expansion fluid into hot cylinder;
the fuel expansion fluid firing with a spark plug to generate pressure within the cylinder expansion chamber to; rotating said piston from a position wherein said expansion chamber is of minimal volume to a position of maximal volume thereby rotating said sun gear and producing mechanical energy; said sun gear rotating said moon gear to transfer power to said drive shaft pushing said piston head from a position substantially at top dead center to bottom dead center, thereby rotating said crank shaft and producing mechanical energy; combusting the fuel with a spark plug; exhausting burnt fuel from the piston firing and injecting new fuel into the expansion chamber to repeat the cycle.

* * * * *